(12) United States Patent
Fattal

(10) Patent No.: US 11,810,525 B2
(45) Date of Patent: Nov. 7, 2023

(54) DUAL VIEW ZONE BACKLIGHT, DUAL-MODE DISPLAY, AND METHOD EMPLOYING DIRECTIONAL EMITTERS

(71) Applicant: LEIA INC., Menlo Park, CA (US)

(72) Inventor: David A. Fattal, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/469,659

(22) Filed: Sep. 8, 2021

(65) Prior Publication Data

US 2021/0407438 A1    Dec. 30, 2021

Related U.S. Application Data

(63) Continuation of application No. PCT/US2019/061886, filed on Nov. 15, 2019.

(60) Provisional application No. 62/819,635, filed on Mar. 17, 2019.

(51) Int. Cl.
*G09G 3/34* (2006.01)
*G09G 3/00* (2006.01)

(52) U.S. Cl.
CPC ............. *G09G 3/342* (2013.01); *G09G 3/001* (2013.01); *G09G 2320/068* (2013.01)

(58) Field of Classification Search
CPC .. G09G 3/342; G09G 3/001; G09G 2320/068; G02B 5/1866; G02B 6/005; G02B 6/0075; G02F 1/133601; G02F 1/133626; G02F 1/1336; G02F 1/133615; G02F 2201/305; G02F 2203/62
USPC ....................................................... 345/694
See application file for complete search history.

(56) References Cited

U.S. PATENT DOCUMENTS

| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |

(Continued)

FOREIGN PATENT DOCUMENTS

| KR | 20120046647 A | 5/2012 |
| WO | 2012038856 A1 | 3/2012 |

(Continued)

OTHER PUBLICATIONS

International Search Report and Written Opinion (ISRWO) by International Searching Authority (ISA) Korean Intellectual Property Office (KIPO) dated Mar. 17, 2020 (11 pages) for foreign counterpart parent International Application No. PCT/US2019/061886.

(Continued)

*Primary Examiner* — Calvin C Ma
(74) *Attorney, Agent, or Firm* — J. Michael Johnson

(57) ABSTRACT

A dual view zone backlight and dual-mode display employ a first backlight region including a directional emitter to provide directional emitted light toward a first view zone and a second backlight region including a broad-angle emitter to provide broad-angle emitted light toward the first and a second view zone in a first mode. The dual-mode display includes a second backlight to provide broad-angle light toward both the first view zone and the second view zone in a second mode.

14 Claims, 9 Drawing Sheets

(56) References Cited

U.S. PATENT DOCUMENTS

| | | |
|---|---|---|
| 10,345,505 B2 | 7/2019 | Fattal |
| 10,551,546 B2 | 2/2020 | Fattal |
| 10,649,128 B2 | 5/2020 | Fattal et al. |
| 10,705,281 B2 | 7/2020 | Fattal et al. |
| 10,798,371 B2 | 10/2020 | Fattal |
| 10,802,212 B2 | 10/2020 | Fattal |
| 10,802,443 B2 | 10/2020 | Fattal |
| 10,810,917 B2 | 10/2020 | Fattal |
| 10,830,939 B2 | 11/2020 | Fattal et al. |
| 10,838,134 B2 | 11/2020 | Fattal et al. |
| 10,884,175 B2 | 1/2021 | Fattal |
| 10,928,564 B2 | 2/2021 | Fattal |
| 10,928,677 B2 | 2/2021 | Aieta et al. |
| 10,969,627 B2 | 4/2021 | Fattal et al. |
| 11,004,407 B2 | 5/2021 | Fattal et al. |
| 11,016,235 B2 | 5/2021 | Fattal et al. |
| 11,041,988 B2 | 6/2021 | Fattal et al. |
| 11,048,036 B2 | 6/2021 | Ma et al. |
| 2008/0258995 A1 | 10/2008 | Vissenberg et al. |
| 2008/0285282 A1* | 11/2008 | Karman ............... G02B 6/0073 362/249.16 |
| 2009/0322986 A1 | 12/2009 | Wei et al. |
| 2012/0200807 A1 | 8/2012 | Wei et al. |
| 2013/0169518 A1 | 7/2013 | Wu et al. |
| 2013/0222734 A1 | 8/2013 | Lee |
| 2017/0108629 A1 | 4/2017 | Lin |
| 2017/0363794 A1 | 12/2017 | Wan et al. |
| 2018/0011237 A1* | 1/2018 | Fattal ................... H04N 13/324 |
| 2019/0018186 A1 | 1/2019 | Fattal |
| 2019/0302336 A1 | 10/2019 | Fattal et al. |
| 2020/0018891 A1 | 1/2020 | Fattal et al. |
| 2020/0033526 A1 | 1/2020 | Fattal et al. |
| 2020/0033621 A1 | 1/2020 | Fattal et al. |
| 2020/0059639 A1 | 2/2020 | Fattal et al. |
| 2020/0301165 A1 | 9/2020 | Fattal |
| 2020/0310135 A1 | 10/2020 | Fattal |
| 2021/0157050 A1 | 5/2021 | Fattal |
| 2021/0407438 A1* | 12/2021 | Fattal ................... G02F 1/1336 |
| 2022/0196902 A1* | 6/2022 | Fattal ................... G02B 6/005 |

FOREIGN PATENT DOCUMENTS

| | | | |
|---|---|---|---|
| WO | 2018187019 A1 | 10/2018 | |
| WO | 2018213100 A1 | 11/2018 | |
| WO | WO/2018/187019 | * 11/2018 | ........... G02B 6/0018 |
| WO | WO/2018/213100 | * 11/2018 | ...... G09G 2320/0242 |
| WO | 2020131087 A1 | 6/2020 | |
| WO | 2020185264 A1 | 9/2020 | |
| WO | 2021076114 A1 | 4/2021 | |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

* cited by examiner

US 11,810,525 B2

DUAL VIEW ZONE BACKLIGHT, DUAL-MODE DISPLAY, AND METHOD EMPLOYING DIRECTIONAL EMITTERS

CROSS-REFERENCE TO RELATED APPLICATIONS

This application is a continuation application of and claims priority to International Patent Application No. PCT/US2019/061886, filed Nov. 15, 2019, which claims the benefit of priority to U.S. Provisional Application Ser. No. 62/819,635, filed on Mar. 17, 2019, the contents of both of which are herein incorporated by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as active displays. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting employing a broad-angle emitter and a directional emitter on the same backlight with application to electronic displays. In various embodiments consistent with the principles herein, a dual view zone backlight is provided. The dual view zone backlight is configured to both emit directional emitted light using the directional emitter toward a first view zone and to emit broad-angle emitted light using the broad-angle emitter toward both the first view zone and a second view zone. Further, a viewing range or cone of the first view zone has a direction that differs from a direction of a viewing range or cone of the second view zone, in various embodiments.

According to various embodiments, a dual-mode display is also provided. In particular, the dual-mode display combines the dual view zone backlight with a broad-angle backlight in a dual-backlight display to provide a first mode comprising two separate images on the same screen and a second mode comprising a single image occupying the whole screen. In some embodiments, the dual-mode display may be a multiview display. Uses of dual view zone backlight and the dual-mode display described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image.

Figure 1A:
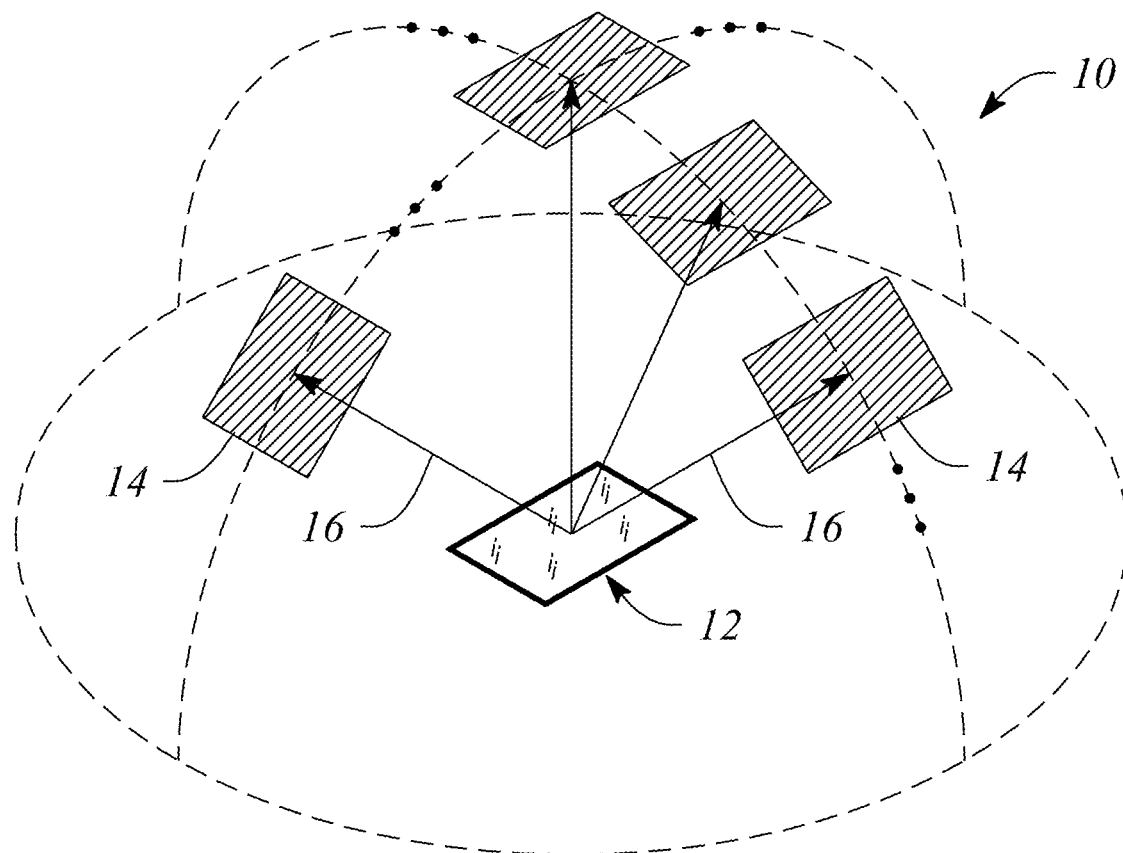
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\varphi$ is an angle in a horizontal plane (e.g., parallel to the multiview display screen plane).

Figure 1B:
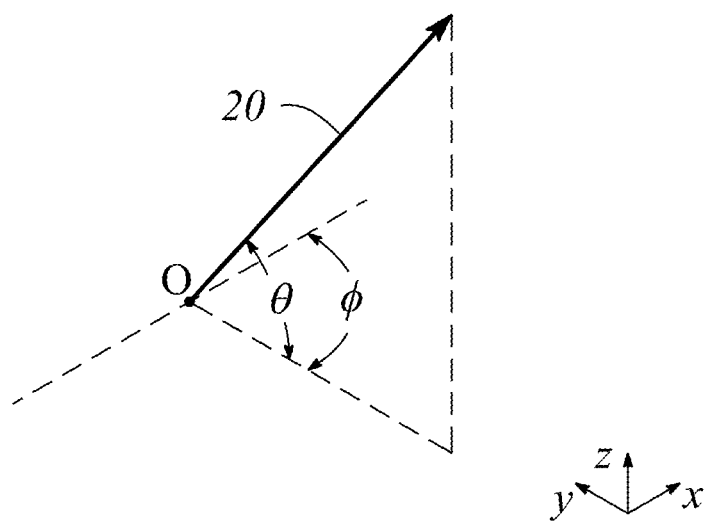
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels (e.g., a set of light valves) representing 'view' pixels in each view of a plurality of different views of a multiview display. In particular, a multiview pixel may have an individual pixel (or light valve) corresponding to or representing a view pixel in each of the different views of the multiview image. Moreover, the pixels of the multiview pixel are so-called 'directional pixels' in that each of the pixels is associated with a predetermined view direction of a corresponding one of the different views, by definition herein. Further, according to various examples and embodiments, the different view pixels represented by the pixels of a multiview pixel may have equivalent or at least substantially similar locations or coordinates in each of the different views. For example, a first multiview pixel may have individual pixels corresponding to view pixels located at $\{x_1, y_1\}$ in each of the different views of a multiview image, while a second multiview pixel may have individual pixels corresponding to view pixels located at $\{x_2, y_2\}$ in each of the different views, and so on.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

By definition herein, a 'multibeam element' is a structure or element of a backlight or a display that produces light that includes a plurality of directional light beams. Directional light beams of the plurality of directional light beams (or 'directional light beam plurality') produced by a multibeam element have different principal angular directions from one another, by definition herein. In particular, by definition, a directional light beam of the directional light beam plurality has a predetermined principal angular direction that is different from another directional light beam of the directional light beam plurality. According to some embodiments, a size of the multibeam element may be comparable to a size of a light valve used in a display that is associated with the multibeam element (e.g., a multiview display). In particular, the multibeam element size may be between about one half and about two times the light valve size, in some embodiments. In some embodiments, a multibeam element may provide polarization-selective scattering.

According to some embodiments, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the directional light beams in combination (i.e., the directional light beam plurality) may represent the light field.

According to various embodiments, the different principal angular directions of the various directional light beams in the directional light beam plurality are determined by a characteristic including, but not limited to, a size (e.g., one or more of length, width, area, and etc.) of the multibeam element along with other characteristics. For example, in a diffractive multibeam element, a 'grating pitch' or a diffractive feature spacing and an orientation of a diffraction grating within diffractive multibeam element may be characteristics that determine, at least in part, the different principal angular directions of the various directional light beams. In some embodiments, the multibeam element may be considered an 'extended point light source', i.e., a plurality of point light sources distributed across an extent of the multibeam element, by definition herein. Further, a directional light beam produced by the multibeam element may have a principal angular direction given by angular components $\{\theta, \varphi\}$, as described above with respect to FIG. 1B.

In some embodiments, the multibeam element may have a shape that is analogous to a shape of an associated multiview pixel. For example, both the multibeam element and the multiview pixel may have a square shape. In another example, a shape of the multibeam element may be rectangular and thus be analogous to associated rectangular shaped multiview pixel. In yet other examples, the multibeam element and the corresponding multiview pixel may have various other analogous shapes including or at least approximated by, but not limited to, a triangular shape, a hexagonal shape, and a circular shape.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a directional scattering element or a multibeam element, as described below) may be employed to diffractively scatter or couple light out of a light guide (e.g., a plate light guide) as a light beam. In particular, a diffraction angle of or provided by a locally periodic diffraction grating may be given by equation (1) as:

$$\theta_m = \sin^{-1}\left(n \sin \theta_i - \frac{m\lambda}{d}\right) \quad (1)$$

where λ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2A:
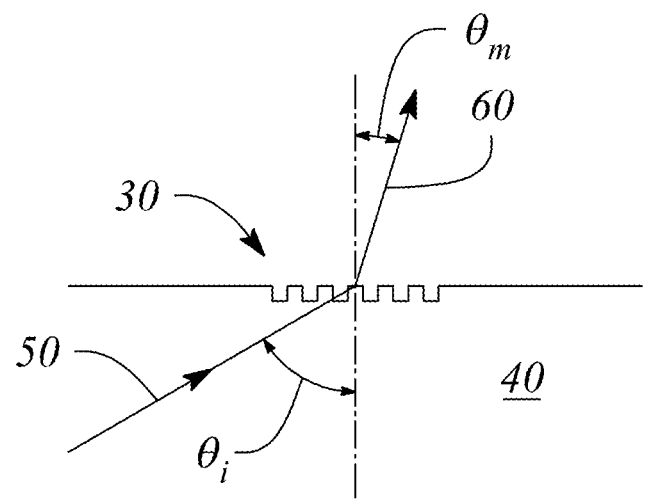
FIG. 2A illustrates a cross sectional view of a diffraction grating in an example, according to an embodiment consistent with the principles described herein.

FIG. 2A illustrates a cross sectional view of a diffraction grating 30 in an example, according to an embodiment consistent with the principles described herein. For example, the diffraction grating 30 may be located on a surface of a light guide 40. In addition, FIG. 2A illustrates a light beam 50 incident on the diffraction grating 30 at an incident angle $\theta_i$. The light beam 50 is a guided light beam within the light guide 40. Also illustrated in FIG. 2A is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example.

Herein by definition, a 'slanted' diffraction grating is a diffraction grating with diffractive features having a slant angle relative to a surface normal of a surface of the diffraction grating. According to various embodiments, a slanted diffraction grating may provide unilateral scattering by diffraction of incident light.

Figure 2B:
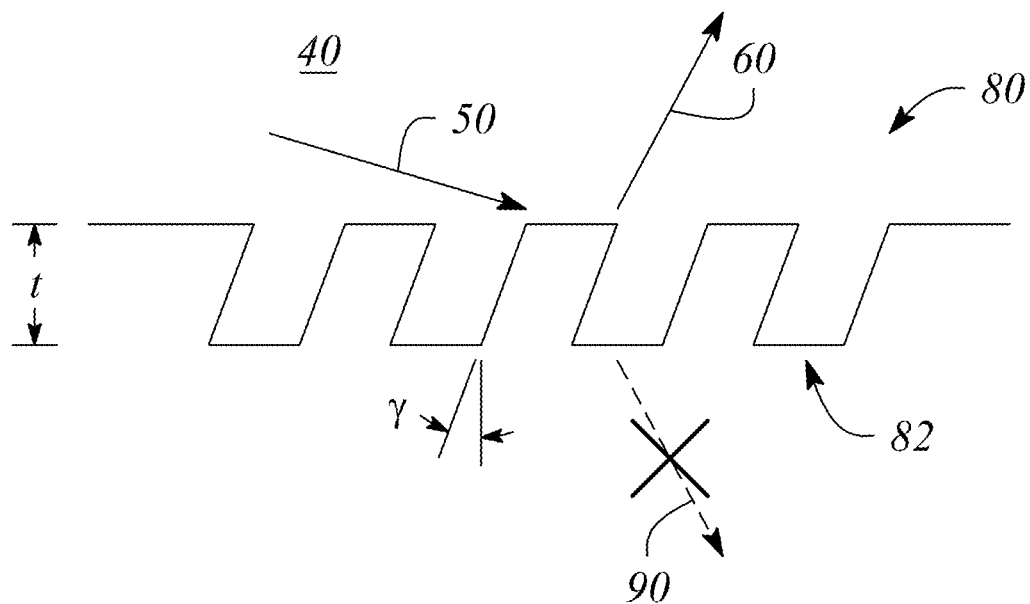
FIG. 2B illustrates a cross-sectional view of a slanted diffraction grating in an example, according to an embodiment consistent with the principles described herein.

FIG. 2B illustrates a cross-sectional view of a slanted diffraction grating 80 in an example, according to an embodiment consistent with the principles described herein. As illustrated, the slanted diffraction grating 80 is a binary diffraction grating located at a surface of a light guide 40, analogous to the diffraction grating 30 illustrated in FIG. 2A. However, the slanted diffraction grating 80 illustrated in FIG. 2B comprises diffractive features 82 having a slant angle γ relative to a surface normal (illustrated by a dashed line) along with a grating height, depth or thickness t, as illustrated. Also illustrated are the incident light beam 50 and a directional light beam 60 representing unilateral diffractive scattering of the incident light beam 50 by the slanted diffraction grating 80. Note that diffractive scattering of light in a secondary direction by the slanted diffraction grating 80 is suppressed by the unilateral diffractive scattering, according to various embodiments. In FIG. 2B, 'crossed out' a dashed-line arrow 90 represents suppressed diffractive scattering in the secondary direction by the slanted diffraction grating 80.

According to various embodiments, the slant angle γ of the diffractive features 82 may be selected to control a unilateral diffraction characteristic of the slanted diffraction grating 80 including a degree to which diffractive scattering in the secondary direction is suppressed. For example, the slant angle γ may be selected to be between about twenty degrees (20°) and about sixty degrees (60°) or between about thirty degrees (30°) and about fifty degrees (50°) or between about forty degrees (40°) and about fifty-five degrees (55°). A slant angle γ in a range of about 30°-60° may provide better than about forty times (40×) suppression of the diffractive scattering in secondary direction, when compared to a unilateral direction provided by the slanted diffraction grating 80, for example. According to some embodiments, the thickness t of the diffractive features 82 may be between about one hundred nanometers (100 nm) and about four hundred nanometers (400 nm). For example, the thickness t may be between about one hundred fifty nanometers (150 nm) and about three hundred nanometers (300 nm) for grating periodicities p in a range from about 300 nm and about five hundred nanometers (500 nm).

Further, the diffractive features may be curved and may also have a predetermined orientation (e.g., a rotation) relative to a propagation direction of light, according to some embodiments. One or both of the curve of the diffractive features and the orientation of the diffractive features may be configured to control a direction of light coupled-out by the diffraction grating, for example. For example, a principal angular direction of the coupled-out light may be a function of an angle of the diffractive feature at a point at which the light is incident on the diffraction grating relative to a propagation direction of the incident light.

By definition, the term 'broad-angle' as in 'broad-angle emitted light' or 'broad-angle viewing' is defined as light having a cone angle that is greater than a cone angle of the view of a multiview image or multiview display. In particular, in some embodiments, the broad-angle emitted light may have a cone angle that is greater than about sixty degrees (60°). In other embodiments, the broad-angle emitted light cone angle may be greater than about fifty degrees (50°), or greater than about forty degrees (40°). For example, the cone angle of the broad-angle emitted light may be about one hundred twenty degrees (120°).

In some embodiments, the broad-angle emitted light cone angle may defined to be about the same as a viewing angle of an LCD computer monitor, an LCD tablet, an LCD television, or a similar digital display device meant for broad-angle viewing (e.g., about ±40-60° relative to a normal direction). In other embodiments, broad-angle emitted light may also be characterized or described as diffuse light, substantially diffuse light, non-directional light (i.e., lacking any specific or defined directionality), or as light having a single or substantially uniform direction.

Herein a 'collimator' is defined as substantially any optical device or apparatus that is configured to collimate light. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s=f(\sigma)$). In some embodiments, the angular spread $\sigma_s$ of the scattered light is a linear function of the angular spread or collimation factor $\sigma$ of the incident light (e.g., $\sigma_s=a\cdot\sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A uniform diffraction grating (i.e., a diffraction grating having a substantially uniform or constant diffractive feature spacing or grating pitch) is an example of an angle-preserving scattering feature.

Herein, the term 'unilateral' as in 'unilateral diffractive scattering element,' is defined as meaning 'one-sided' or 'preferentially in one direction' correspond to a first side as opposed to another direction correspond to a second side. In particular, a 'unilateral backlight' is defined as a backlight that emits light from a first side and not from a second side opposite the first side. For example, a unilateral backlight may emit light into a first (e.g., positive) half-space, but not into the corresponding second (e.g., negative) half-space. The first half-space may be above the unilateral backlight and the second half-space may be below the unilateral backlight. As such, the unilateral backlight may emit light into a region or toward a direction that is above the unilateral backlight and emit little or no light into another region or toward another direction that is below the unilateral backlight, for example. Similarly a 'unilateral scatterer' such as, but not limited to, a unilateral diffractive scattering element or a unilateral multibeam element is configured to scatter light toward and out of a first surface, but not a second surface opposite the first surface, by definition herein.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Herein, an 'active optical emitter' is defined as an active source of light (e.g., an optical emitter configured to produce and emit light when activated). As such, an active optical emitter does not receive light from another source of light, by definition. Instead, the active optical emitter directly generates light when activated. The active optical emitter may be activated by applying a power source such as a voltage or a current, by definition herein. For example, the active optical emitter may comprise an optical emitter such as a light emitting diode (LED) that emits light when activated or turned on. Applying a voltage to terminals of the LED, for example, may activate the LED. In particular, herein the light source may be substantially any active source of light or comprise substantially any active optical emitter including, but not limited to, one or more of a light emitting diode (LED), a laser, an organic light emitting diode (OLED), a polymer light emitting diode, a plasma-based optical emitter, and a micro LED (µLED). The light produced by the active optical emitter may have a color (i.e., may include a particular wavelength of light), or may be a plurality or range of wavelengths (e.g., polychromatic light or white light). Different colors of light provided or produced by an active optical emitter may include, but are not limited to, primary colors (e.g., red, green, blue), for example. By definition herein, a 'color emitter' is an active optical emitter that provides light having a color. In some embodiments, the active optical emitter may comprise a plurality of active optical emitters. For example, the active optical emitter may include a set or group of active optical emitters. In some embodiments, at least one of the active optical emitters in the set or group of active optical emitters may generate light having a color, or equivalently a wavelength, that differs from a color or wavelength of light produced by at least one other optical emitter of the plurality.

Herein, a 'view zone' is defined as a region or an angular range in which a displayed image may be viewed. In particular, the displayed image may be visible within the view zone, but not visible outside of the view zone, by definition herein.

Further, as used herein, the article 'a' is intended to have its ordinary meaning in the patent arts, namely 'one or more'. For example, 'a directional scattering element' means one or more directional scattering elements and as such, 'the directional scattering element' means 'directional scattering element(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
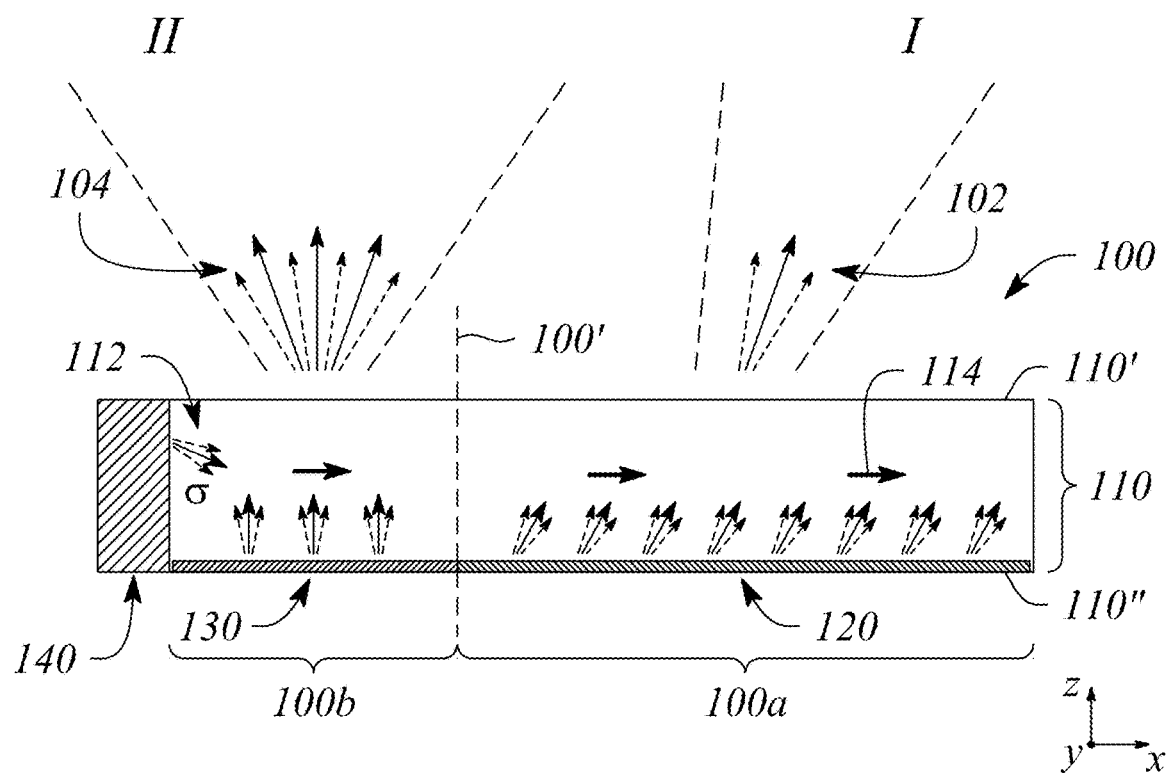
FIG. 3A illustrates a cross-sectional view of a dual view zone backlight in an example, according to an embodiment consistent with the principles described herein.
Figure 3B:
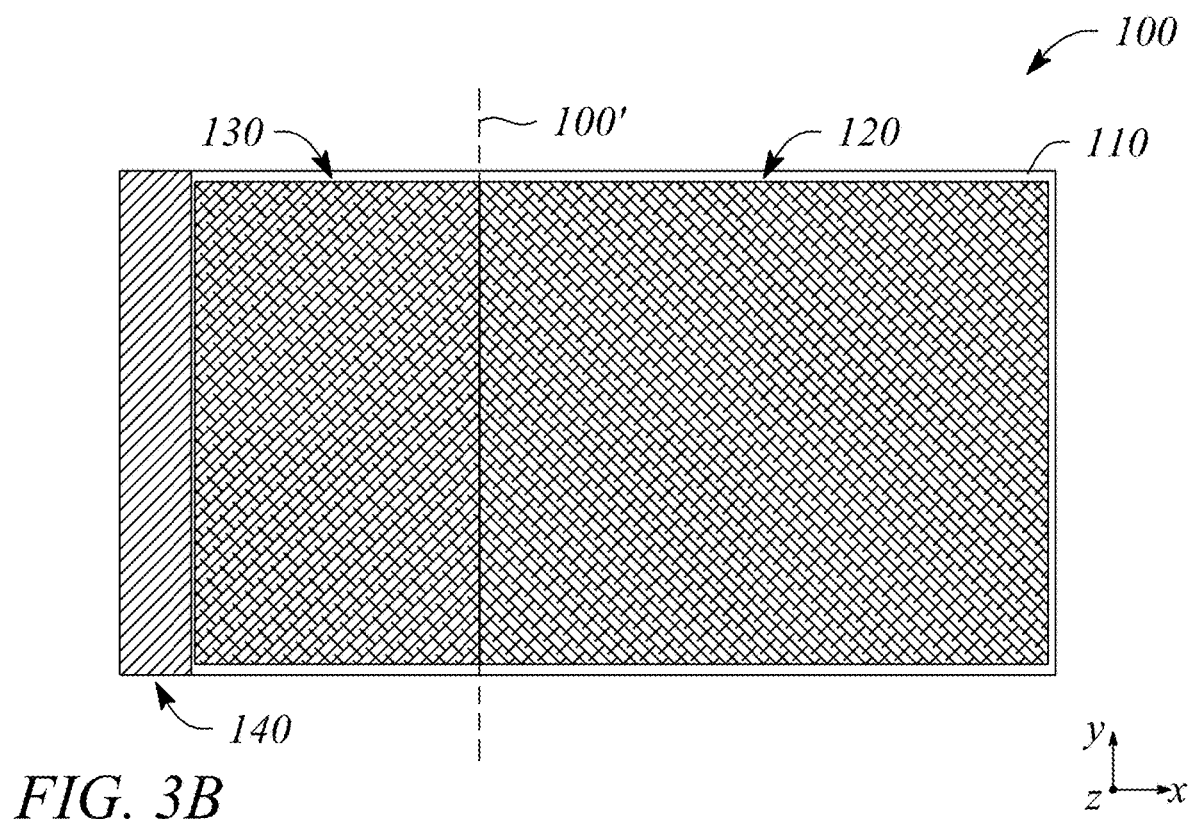
FIG. 3B illustrates a plan view of a dual view zone backlight in an example, according to an embodiment consistent with the principles described herein.
Figure 3C:
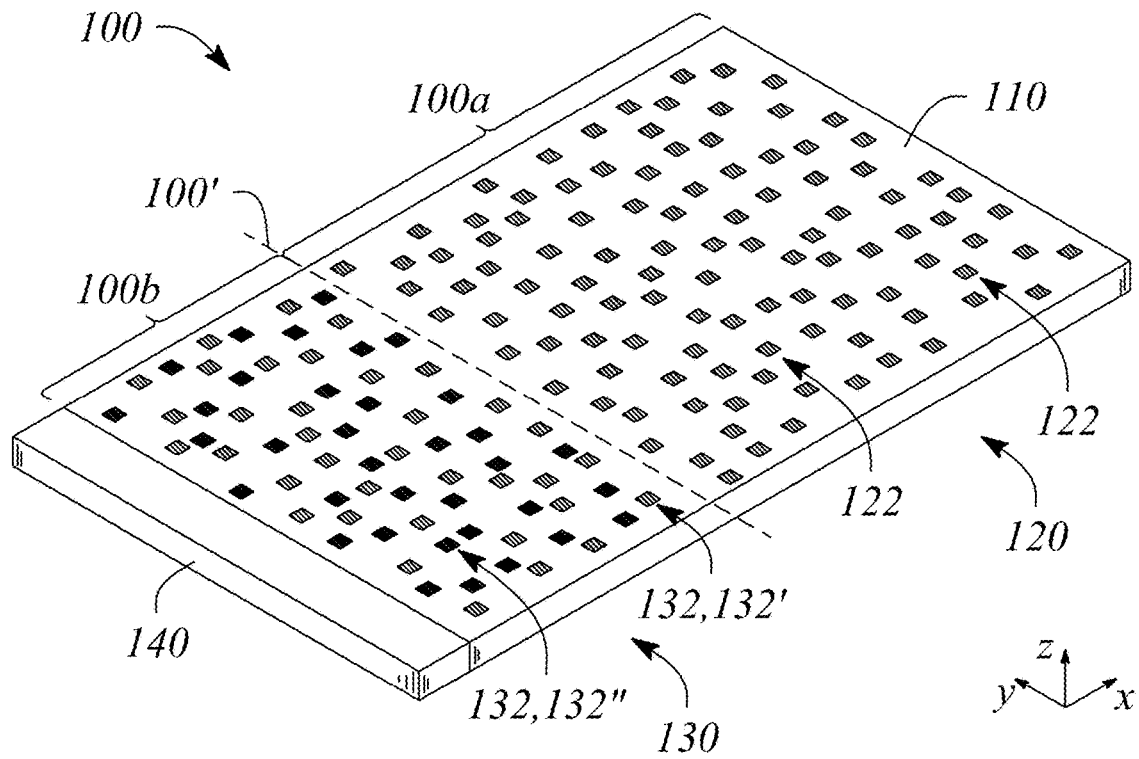
FIG. 3C illustrates a perspective view of a dual view zone backlight in an example, according to another embodiment consistent with the principles described herein.

According to some embodiments of the principles described herein, a dual view zone backlight is provided. FIG. 3A illustrates a cross-sectional view of a dual view zone backlight 100 in an example, according to an embodiment consistent with the principles described herein. FIG. 3B illustrates a plan view of a dual view zone backlight 100 in an example, according to an embodiment consistent with the principles described herein. FIG. 3C illustrates a perspective view of a dual view zone backlight 100 in an example, according to another embodiment consistent with the principles described herein. The illustrated dual view zone backlight 100 may be used for backlighting in an electronic display including, but not limited to, a dual-mode display described below, for example.

The dual view zone backlight 100 illustrated in FIGS. 3A-3C comprises a first backlight region 100a and a second backlight region 100b, the second backlight region 100b being adjacent to the first backlight region 100a. The first backlight region 100a comprises a directional emitter 120 configured to emit directional emitted light 102. In particular, the directional emitted light 102 emitted by the directional emitter 120 is directed toward a first view zone I of the dual view zone backlight 100 by the first backlight regions 100a, according to various embodiments. The second backlight region 100b comprises a broad-angle emitter 130 configured to emit broad-angle emitted light 104 toward both the first view zone I and a second view zone II. According to various embodiments, a viewing range or cone of the first view zone I has a direction that differs from a direction of a viewing range of the second view zone II. In some embodiments, the viewing range of the first view zone I and viewing range of the second view zone II are mutually exclusive in angular space.

In FIG. 3A, the viewing range or cone of the first view zone I is represented by dashed lines depicting both an angular range and the direction of the viewing range (e.g., viewing angular range or cone angle). The directional emitted light 102 emitted by the directional emitter 120 of the first backlight region 100a may be substantially confined to the viewing range or cone angle of the first view zone I (i.e., confined between the dashed lines), e.g., as illustrated. Similarly, in FIG. 3A the second view zone I has a viewing range with both an angular range and a direction as illustrated by dashed lines in FIG. 3A. The viewing range of the first view zone I has a different direction from the viewing range of the second view zone II, as illustrated. Further, the viewing ranges of the first and second view zones I, II are mutually exclusive in angular space, as illustrated in FIG. 3A. That is, the view ranges or cones do not overlap one another. In other embodiments (not illustrated), the view ranges of the first and second view zones I, II may overlap one another, at least to some extent.

In FIGS. 3A-3C, the adjacent first and second backlight regions 100a, 100b are illustrated as being separated by a boundary 100'. The boundary 100', illustrated as a dashed line, may represent an intersection between a y-z plane and the dual view zone backlight 100, for example. In FIGS. 3A-3C, the boundary 100' is merely a virtual separation that delineates each of the first and second backlight regions 100a, 100b. As illustrated, the first backlight region 100a occupies a first portion of the dual view zone backlight 100 located to a side of the boundary 100', while the second backlight region 100b occupies a second portion on an opposite side of the boundary 100'.

According to various embodiments, the boundary 100' between the first and second backlight regions 100a, 100b may be located substantially anywhere along the length (i.e., x-direction) of the dual view zone backlight 100. For example, as illustrated, the boundary 100' is located at about two-thirds of a length of the dual view zone backlight 100. Thus, the first backlight region 100a comprises about two thirds of the dual view zone backlight 100 and the second backlight region 100b comprises about one third of the dual view zone backlight 100, as illustrated. In other embodiments (not illustrated), the first backlight region 100a may comprise about half of the dual view zone backlight 100, or one third of the dual view zone backlight 100, with the second backlight region 100b comprising a remaining portion thereof. In yet other embodiments (not illustrated), the boundary 100' may be located along a length of the dual view zone backlight 100, e.g., along an intersection between an x-z plane and the dual view zone backlight 100. As such, the boundary 100' may divide the dual view zone backlight 100 into an 'upper' region and a 'lower' region with one of the upper and lower regions corresponding to the first backlight region 100a and the other corresponding to the second backlight region 100b. In some embodiments (not illustrated), the boundary 100' may be curved or piecewise linear (e.g., other than straight, as illustrated). For example, the second backlight region 100b may occupy a rectangular portion of the dual view zone backlight 100, with the first backlight region 100a being adjacent on more than one side of the second backlight region 100b.

As mentioned above, the directional emitted light 102 that is emitted by the directional emitter 120 of the first backlight region 100a may be confined to a region of angular space representing the viewing range of the first view zone I. In various embodiments, a cone angle of the directional emitted light 102 may be relatively narrow. In particular, the directional emitted light 102 may have a cone angle that is less than about sixty degrees (60°). In other embodiments, the directional emitted light 102 may have a cone angle that is less than about forty degrees (40°), or less than about thirty degrees (30°), or less than about twenty degrees (20°). In yet other embodiments, the cone angle of the viewing zone of the first view zone I may be greater than 60°, but less than about ninety degrees (90°), such that a direction of the viewing range is confined or at least substantially confined to a halfspace on a side of the dual view zone backlight 100 corresponding to the first backlight region 100a, e.g., a halfspace above the dual view zone backlight 100 and to a right of the boundary 100', as illustrated in FIG. 3A.

By contrast, the broad-angle emitted light 104 emitted by the broad-angle emitter 130 may be provided in a region of angular space that is relative wide. The relatively wide angle of the broad-angle emitted light 104 allows the broad-angle emitted light 104 to illuminate or reach both the first view zone I and the second view zone II. The broad-angle emitted light 104 provided by the broad-angle emitter 130 of the second backlight region 100b may be suitable for use as an illumination source in display applications meant for broad-angle viewing. For example, the broad-angle emitted light 104 may have a cone angle of about ±40-60° or greater. The broad-angle emitted light cone angle may provide about the same view angle as a LCD monitor, LCD tablet, or LCD television, in some embodiments.

Figure 4:
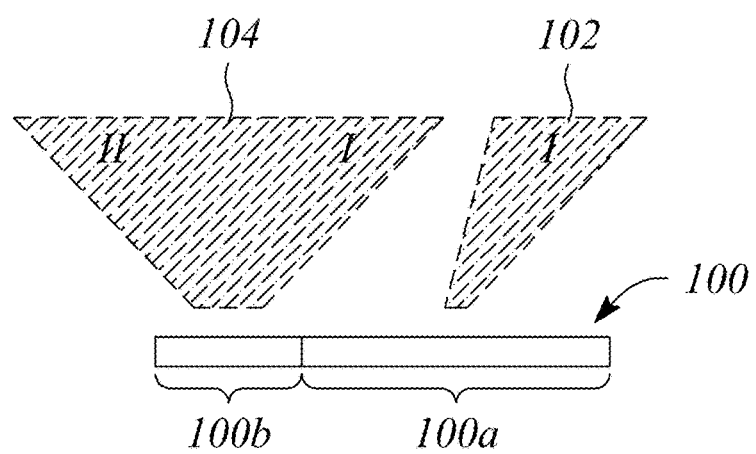
FIG. 4 illustrates a graphical representation of illumination provided by a dual view zone backlight in an example, according to an embodiment consistent with the principles described herein.

FIG. 4 illustrates a graphical representation of illumination provided by a dual view zone backlight 100 in an example, according to an embodiment consistent with the principles described herein. As illustrated, the first backlight region 100a provides directional emitted light 102 using the directional emitter 120 and the second backlight region 100b provides broad-angle emitted light 104 using the broad-angle emitter 130. Further, the directional emitted light 102 provided by the first backlight region 100a using the directional emitter 120 is configured to exclusively illuminate the first view zone I, while the broad-angle emitted light 104 provided by the second backlight regions 100b using the broad-angle emitter 130 is configured to illuminate both the first view zone I and the second view zone II, as illustrated in FIG. 4.

Further, as mentioned above, the dual view zone backlight 100 provides a viewing range or cone in the first view zone I having a direction that differs from a direction of a viewing range or cone of the second view zone II. That is, a centerline of the viewing range of the first view zone I and a centerline of the viewing range of the second view zone II are not parallel, but instead diverge from one another. In terms of emitted light, the directional emitted light 102 emitted by the directional emitter 120 of the first backlight region 100a and the broad-angle emitted light 104 emitted by the broad-angle emitter 130 of the second backlight region 100b are emitted toward different directions. In particular, in some embodiments, a direction of the directional emitted light 102 and also the direction of the viewing range of the first view zone I is skewed or tilted away from a direction of the view cone of the second view zone II. A tilt of the viewing range of the first view zone I may serve to minimize entry of directional emitted light 102 into the second view zone II, for example. Accordingly, in some embodiments, the directional emitted light 102 from the directional emitter 120 has a tilt angle relative to a normal of a surface corresponding to the first backlight region 100a and from which the directional emitted light 102 is emitted by the directional emitter 120. For example, a directional emitted light 102 emitted by the directional emitter 120 of the first backlight region 100a may have a tilt angle between about twenty degrees (20°) and about forty-five degrees (45°) relative to the surface normal. In other non-limiting examples, the tilt angle may be greater than about ten degrees (10°), or fifteen degrees (15°), or thirty degrees (30°), or fifty degrees (50°). An angle of the viewing range or cone (e.g., cone angle) in which the directional emitted light 102 is confined may be centered about the tilt angle, according to various embodiments.

Figure 7A:
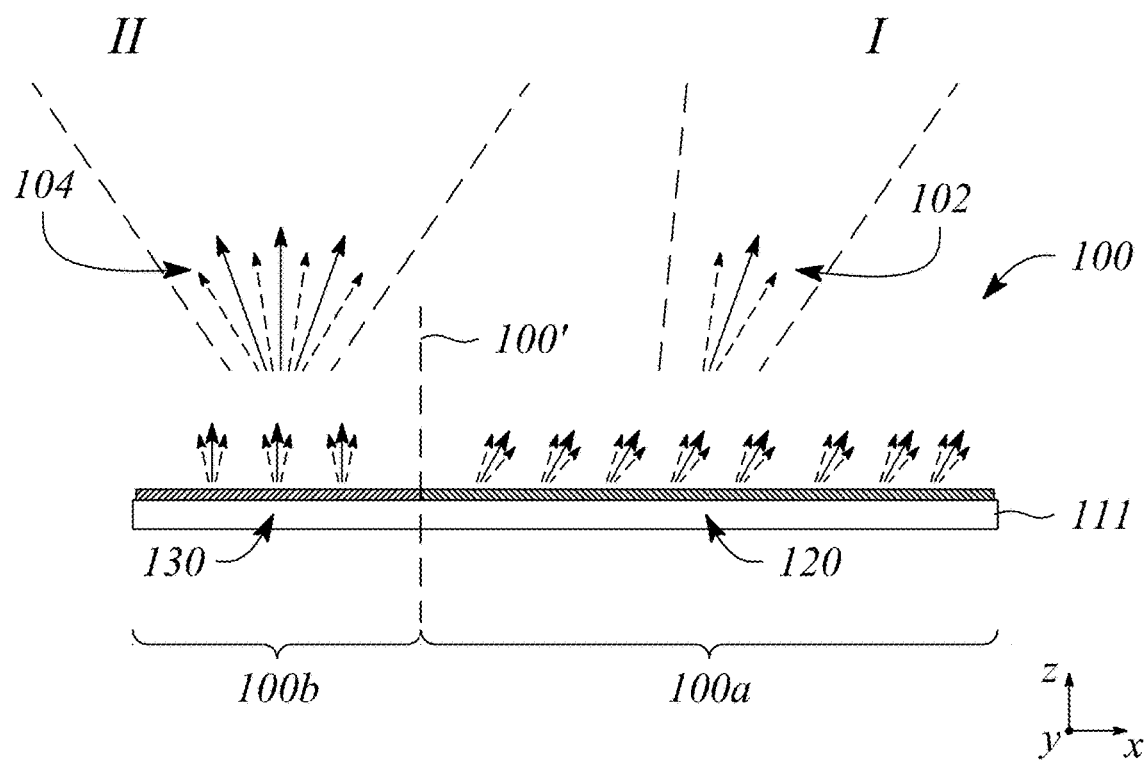
FIG. 7A illustrates a cross-sectional view of a dual view zone backlight in an example, according to an embodiment consistent with the principles described herein.
Figure 7B:
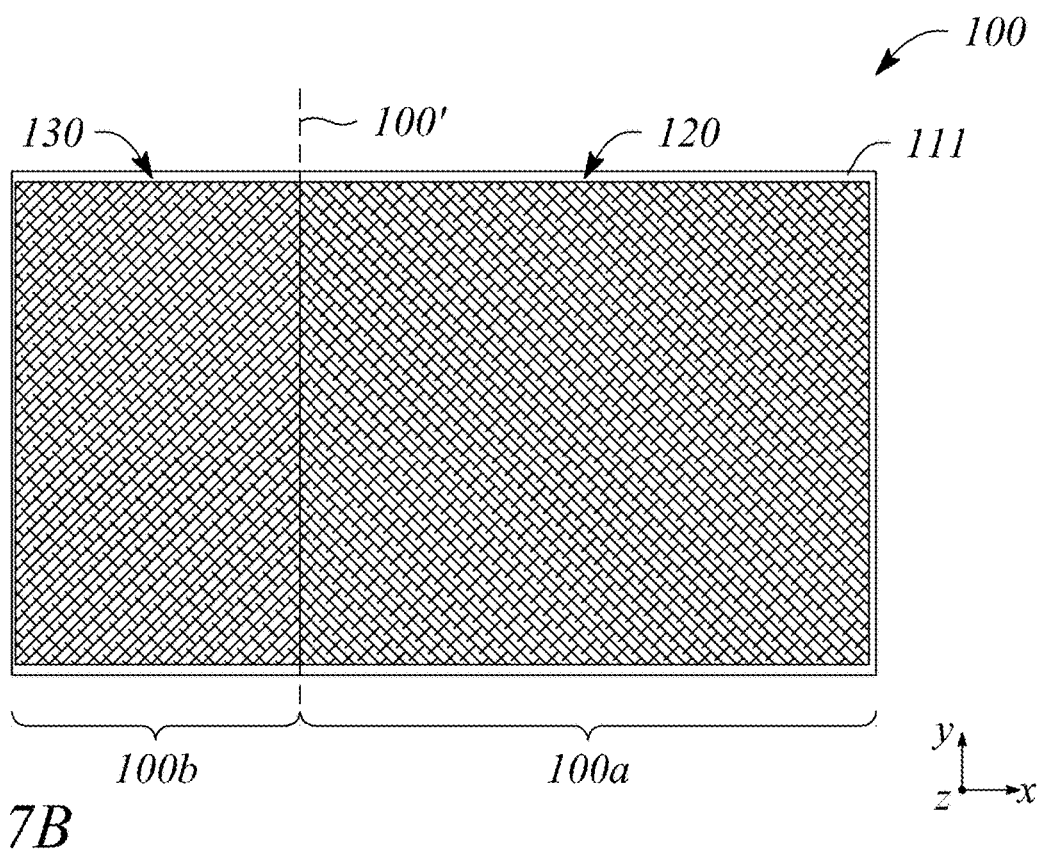
FIG. 7B illustrates a cross-sectional view of a dual view zone backlight in another example, according to an embodiment consistent with the principles described herein.
Figure 7C:
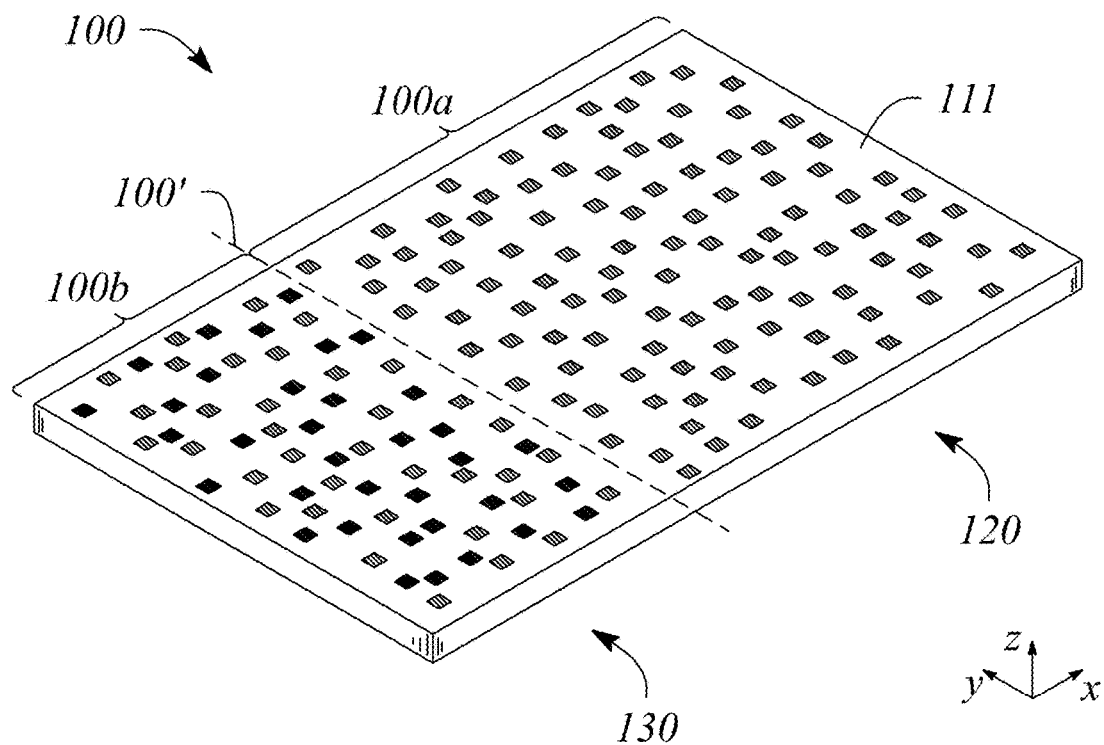
FIG. 7C illustrates a perspective view of a dual view zone backlight in an example, according to another embodiment consistent with the principles described herein.

In some embodiments (e.g., as illustrated in FIGS. 3A-3C), one or both of the directional emitter 120 and the broad-angle emitter 130 comprise passive optical emitters. In particular, as passive emitters the directional emitter 120 and broad-angle emitter 130 do not generate light themselves, but instead redirect light from another source to the provide emitted light representing the directional emitted light 102 and broad-angle emitted light 104, respectively. In other embodiments (e.g., as illustrated in FIGS. 7A-7C, described below), one or both of the directional emitter 120 of the first backlight region 100a and the broad-angle emitter 130 of the second backlight region 100b comprise active optical emitters. The active optical emitters of the directional emitter 120 and broad-angle emitter 130 directly generate the emitted light representing the directional emitted light 102 and the broad-angle emitted light 104, respectively.

According to some embodiments in which one or both of the directional emitter 120 and the broad-angle emitter 130 comprise passive optical emitters (e.g., as illustrated in FIGS. 3A-3C), the dual view zone backlight 100 may further comprise a light guide 110. The light guide 110 is configured to guide light along a length of the light guide 110 as guided light 112 (i.e., a guided light beam 112). For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 112 according to one or more guided modes of the light guide 110, for example.

In some embodiments, the light guide 110 may be a slab or plate optical waveguide (i.e., a plate light guide) comprising an extended, substantially planar sheet of optically transparent, dielectric material. The substantially planar sheet of dielectric material is configured to guide the guided light 112 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the first surface and the second surface) of the light guide 110. The cladding layer may be used to further facilitate total internal reflection, according to some examples.

Further, according to some embodiments, the light guide 110 is configured to guide the guided light 112 according to total internal reflection at a non-zero propagation angle between a first surface 110' (e.g., front or top surface or side) and a second surface 110" (e.g., back or bottom surface or side) of the light guide 110. In particular, the guided light 112 propagates by reflecting or 'bouncing' between the first surface 110' and the second surface 110" of the light guide 110 at the non-zero propagation angle. In some embodiments, a plurality of guided light beams 112 comprising different colors of light may be guided by the light guide 110 at respective ones of different color-specific, non-zero propagation angles. Note, the non-zero propagation angle is not illustrated in FIG. 3A for simplicity of illustration. However, a bold arrow depicting a propagation direction 114 illustrates a general propagation direction of the guided light 112 along the light guide length in FIG. 3A.

In some embodiments, the guided light 112 may be collimated or equivalently may be a collimated light beam (e.g., provided by a collimator, as described below). Herein, a 'collimated light' or 'collimated light beam' is generally defined as a beam of light in which rays of the light beam are substantially confined to a predetermined or defined angular spread within the light beam (e.g., the guided light 112). Further, rays of light that diverge or are scattered from the collimated light beam are not considered to be part of the collimated light beam, by definition herein. Moreover, the guided light 112 may be collimated according to or having a collimation factor σ, in various embodiments.

According to some embodiments, the directional emitter 120 of the dual view zone backlight 100 illustrated in FIGS. 3A-3C may comprise a directional scattering feature. The directional scattering feature of the directional emitter 120 is configured to scatter out of the light guide a portion of the guided light 112 as the directional emitted light 102 from a portion of the light guide 110 corresponding to the first backlight region 100a. In particular, the directional scattering feature of the directional emitter 120 may be located in the portion of the light guide 110 corresponding to the first backlight region 100a, according to some embodiments. In some embodiments, the directional scattering feature of the directional emitter 120 may be confined exclusively to the first backlight region 100a. In other words, the first backlight region 100a may comprise the directional scattering feature of the directional emitter 120 along with the portion of the light guide 110 that includes the directional scattering feature.

In some embodiments (e.g., as illustrated in FIG. 3C), the directional scattering feature of the directional emitter 120 comprises a plurality of directional scattering elements 122 (or equivalently, directional scatterers). The directional scattering elements 122 of the plurality may be spaced apart from one another along a length of the light guide portion corresponding to the first backlight region 100a. According to various embodiments, a directional scattering element 122 of the directional scattering element plurality is configured to scatter out of the light guide 110 a portion of guided light 112 as the directional emitted light 102. In addition, the directional scattering elements 122 of the plurality may be separated from one another by a finite space and represent individual, distinct elements along the light guide length. In particular, by definition herein, directional scattering elements 122 of the plurality are spaced apart from one another according to a finite (i.e., non-zero) inter-element distance (e.g., a finite center-to-center distance). Further, the directional scattering elements 122 of the plurality generally do not intersect, overlap or otherwise touch one another, according to some embodiments. That is, each directional scattering element 122 of the plurality is generally distinct and separated from other ones of the directional scattering elements 122 of the plurality.

In various embodiments, the plurality of directional scattering elements 122 may be arranged in a variety of configurations that are one or more of at, on and in the surface (e.g., the first surface 110' or the second surface 110") of the light guide 110. For example, directional scattering elements 122 may be arranged in columns and rows across the light guide surface (e.g., as an array). In another example, a plurality of directional scattering elements 122 may be arranged in groups and the groups may be arranged in rows and columns. In yet another example, the plurality of directional scattering elements 122 may be randomly distributed across the light guide 110, e.g., as illustrated in FIG. 3C.

In various embodiments, the directional scattering elements 122 may comprise any of a variety of different structures or features that provide or are configured to produce directional scattering including, but not limited to, a diffraction grating, a micro-reflective scattering element, and a micro-refractive scattering element, as well as various combinations thereof having directional scattering characteristics. In some embodiments, the direction scattering feature of the directional emitter 120 (or a directional scattering element 122 thereof) may be configured as an angle-preserving scattering feature (or element). In some embodiments, the direction scattering feature of the directional emitter 120 (or a directional scattering element 122 thereof) may be configured as a unilateral scattering feature (or unilateral scattering element).

According to some embodiments, broad-angle emitter 130 of the dual view zone backlight 100 illustrated in FIGS. 3A-3C may comprise a broad-angle scattering feature. The broad-angle scattering feature of the broad-angle emitter 130 is configured to scatter out of the light guide 110 a portion of the guided light 112 as the broad-angle emitted light 104 from a portion of the light guide 110 corresponding to the second backlight region 100b. In particular, the broad-angle scattering feature of the broad-angle emitter 130 may be located in the portion of the light guide 110 corresponding to the second backlight region 100b, according to some embodiments. In some embodiments, the broad-angle scattering feature may be confined exclusively to the second backlight region 100b. In other words, the second backlight region 100b may comprise the broad-angle scattering feature along with the portion of the light guide 110 that includes the broad-angle scattering feature of the broad-angle emitter 130.

According to various embodiments, the broad-angle scattering feature of the broad-angle emitter 130 may comprise substantially any scattering feature configured to provide the broad-angle emitted light 104. In some embodiments, the broad-angle scattering feature comprises a plurality of directional scattering elements 132, e.g., as illustrated in FIG. 3C. Specifically, the broad-angle scattering feature of the broad-angle emitter 130 may comprise a first plurality of directional scattering elements 132' configured to scatter out the guided light portion in the direction of the first view zone I. The broad-angle scattering feature of the broad-angle emitter 130 may further comprise a second plurality of directional scattering elements 132" configured to scatter out the guided light portion in the direction of the second view zone II. According to various embodiments, directional scattering elements 132', 132" of both the first directional scattering element plurality and the second directional scattering element plurality may be spaced apart from one another along a length of the light guide portion corresponding to the second backlight region 100b.

In some embodiments, a directional scattering element 132 of one or both of the first and second directional scattering element pluralities may be the same as, or substantially similar to, a directional scattering element 122 of the first backlight region 100a. Accordingly, a directional scattering element 132 of the first or second plurality of directional scattering elements 132', 132" may comprise any of a variety of different structures or features that provide or are configured to provide scattering including, but not limited to, a diffraction grating, a micro-reflective scattering element, and a micro-refractive scattering element, as well as various combinations thereof. Further, broad-angle scattering feature of the broad-angle emitter 130 (or the first and second pluralities of directional scattering elements 132', 132" thereof) may be configured as an angle-preserving scattering feature (or elements). In some embodiments, the broad-angle scattering feature of the broad-angle emitter 130 (or the first and second pluralities of directional scattering elements 132', 132" thereof) may be configured as a unilateral scattering feature (or unilateral scattering elements).

In some embodiments, the directional scattering elements 132 of both the first directional scattering element plurality and the second directional scattering element plurality of the second backlight region 100b are randomly distributed across a length and a width of the portion of the light guide 110 corresponding to the second backlight region 100b. The first plurality of directional scattering elements 132' and the second plurality of the directional scattering elements 132" combine to scatter out or couple out portions of guided light in a broad-angle scattering manner to provide the broad-angle emitted light 104 directed toward both the first view zone I and the second view zone II, according to various embodiments.

In some embodiments, the dual view zone backlight 100 may be optically transparent to light incident upon the dual view zone backlight 100 in a direction substantially orthogonal to a surface of the light guide 110. In particular, any effects of the directional scattering feature of the directional emitter 120 and broad-angle scattering feature of the broad-angle emitter 130 on such light may be minimal. Instead, the directional scattering feature and broad-angle scattering feature are configured to interact with guided light propagating at a non-zero propagation angle and incident on the features at an angle from within the light guide 110, according to various embodiments.

In some embodiments, one or both of the directional scattering feature of the directional emitter 120 and the broad-angle scattering feature of the broad-angle emitter 130 may comprise a plurality of multibeam elements. For example, directional scattering elements 122, 132 of the directional scattering element plurality may be or comprise multibeam elements. A multibeam element of the multibeam element plurality is configured to scatter out light from the light guide 110 as a plurality of directional light beams having principal angular directions corresponding to view directions of a multiview image. According to various embodiments, the multibeam element may comprise any of a number of different structures configured to scatter out a portion of the guided light 112. For example, the different structures may include, but are not limited to, diffraction gratings, micro-reflective elements, micro-refractive elements, or various combinations thereof. The multibeam element comprising a diffraction grating is configured to diffractively scatter out the guided light portion as the plurality of directional light beams having the different principal angular directions; the multibeam element comprising a micro-reflective element is configured to reflectively scatter out the guided light portion as the plurality of directional light beams; and the multibeam element comprising a micro-refractive element is configured to scatter out the guided light portion as the plurality of directional light beams by or using refraction (i.e., refractively couple out the guided light portion), according to various embodiments.

Figure 5A:
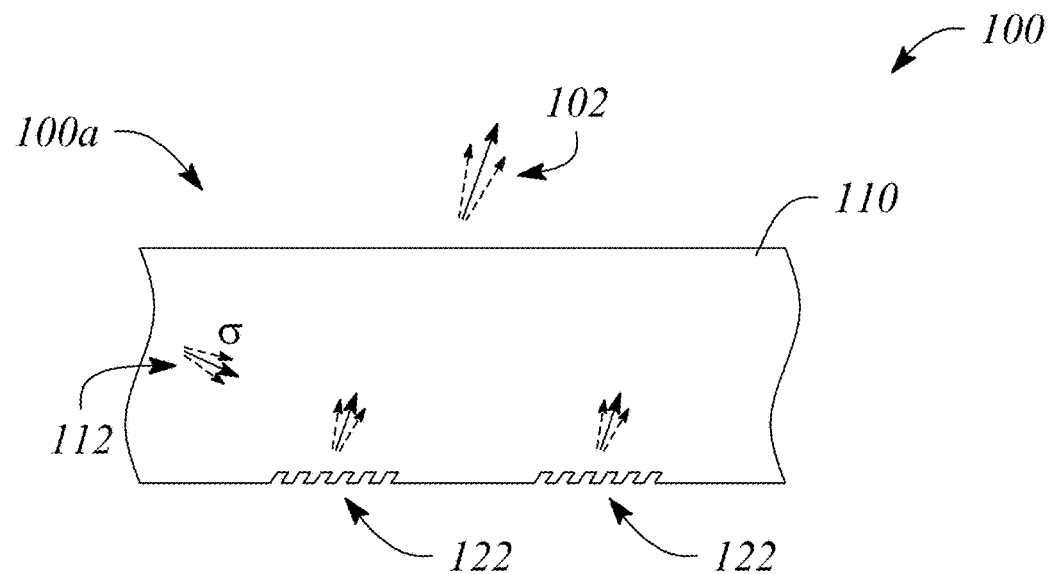
FIG. 5A illustrates a cross-sectional view of a portion of a dual view zone backlight in an example, according to an embodiment consistent with the principles described herein.
Figure 5B:
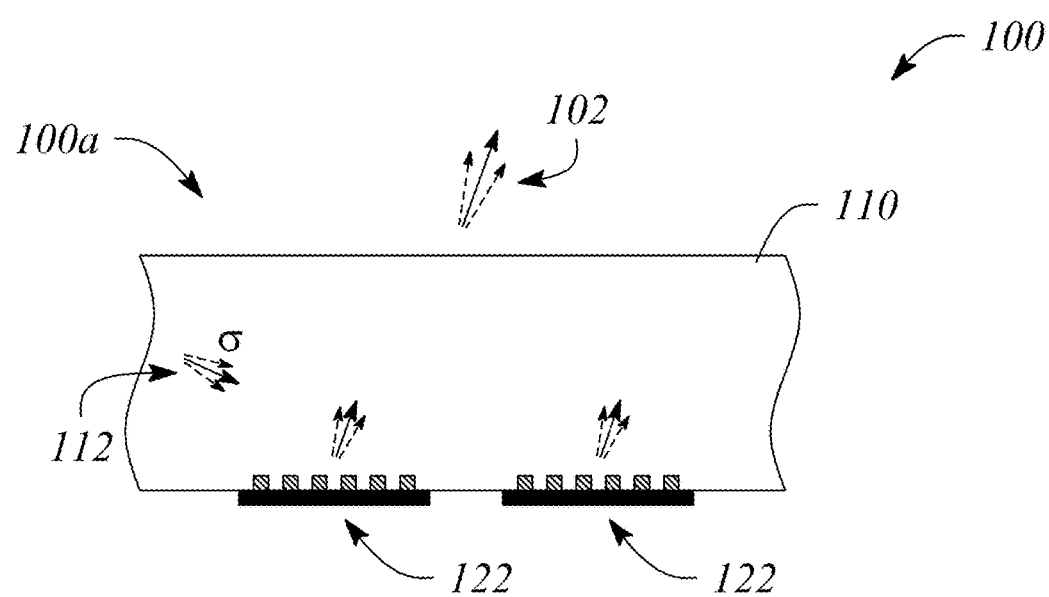
FIG. 5B illustrates a cross-sectional view of a portion of a dual view zone backlight in an example, according to another embodiment consistent with the principles described herein.

FIG. 5A illustrates a cross-sectional view of a portion of a dual view zone backlight 100 in an example, according to an embodiment consistent with the principles described herein. FIG. 5B illustrates a cross-sectional view of a portion of a dual view zone backlight 100 in an example, according to another embodiment consistent with the principles described herein. In particular, FIGS. 5A-5B illustrate a portion of the a dual view zone backlight 100 including the light guide 110 and a pair of directional scattering elements 122. Each of the directional scattering elements 122 comprises a diffraction grating configured to provide unilateral scattering. In particular, the directional scattering elements 122 in FIG. 5A each comprise a slanted diffraction grating, while in FIG. 5B, the directional scattering elements 122 comprise a reflective diffraction grating, as illustrated. The reflective diffraction grating may comprise a diffraction grating and a reflective material layer, for example.

As illustrated, the diffraction gratings of the directional scatter elements 122 provide unilateral scattering of the guided light 112 to provide directional emitted light 102. As such, the portion of the dual view zone backlight 100 illustrated FIGS. 5A-5B may represent a portion of the first backlight region 100a. Although not illustrated, the pair of directional scattering elements 122 alternatively may be configured to provide broad-angle emitted light 104 and thus the illustrated portion of the dual view zone backlight 100 may equally represent a portion of the second backlight region 100b. For example (not illustrated), a first directional scattering element 122 of the pair may be configured to scatter out a portion of the guided light 112 in the direction of view zone I and a second scattering directional element 122 of the pair may be configured to scatter another portion of the guided light 112 toward the second view zone II.

According to some embodiments, the dual view zone backlight 100 may further comprise collimated light source 140 at an input of the light guide 110. The collimated light source 140 is configured to provide collimated light to the light guide 110 to be guided as the guided light 112. In some embodiments, the collimated light source 140 may comprise separately a light source and a collimator, the collimator being disposed between the light source and the light guide 110. The collimator may be configured to collimate substantially uncollimated light generated by the light source to provide collimated light. The collimator may be further configured to communicate the collimate light to the light guide 110. The collimated light may have a non-zero propagation angle and may be collimated according to a predetermined collimation factor σ when delivered to the light guide 110 to be guided as the guided light 112, according to some embodiments.

Figure 6:
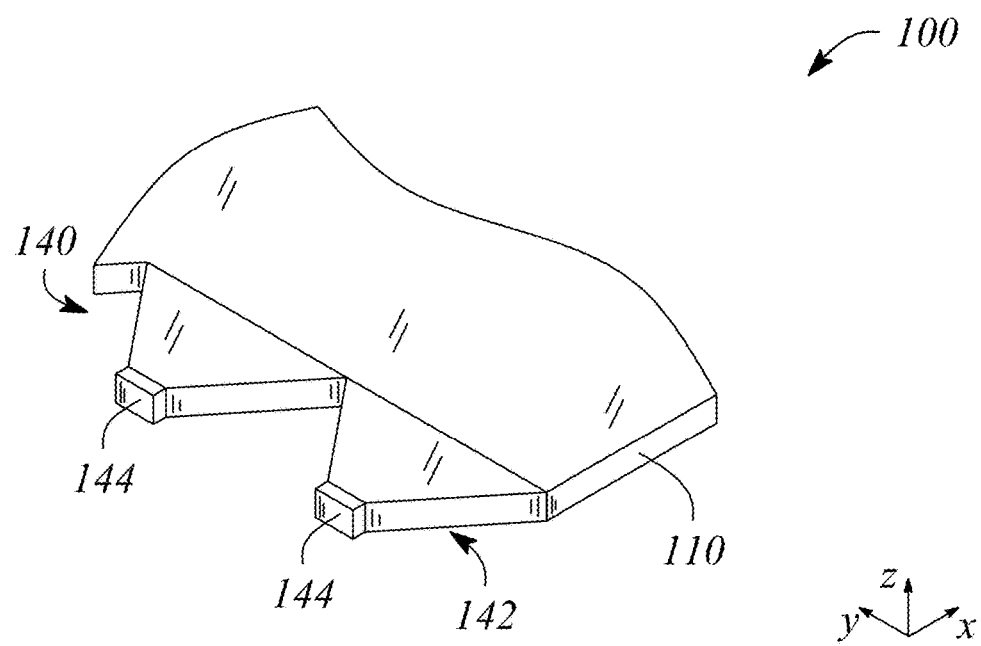
FIG. 6 illustrates a perspective view of a portion of a dual view zone backlight including a collimated light source in an example, according to an embodiment consistent with the principles described herein.

In some embodiments, the collimated light source 140 may comprise a tapered collimator. FIG. 6 illustrates a perspective view of a portion of a dual view zone backlight 100 including a collimated light source 140 in an example, according to an embodiment consistent with the principles described herein. As illustrated, the dual view zone backlight 100 comprises the light guide 110, a first backlight region 100a and a second backlight region 100b. The illustrated dual view zone backlight 100 further comprises the collimated light source 140 at an edge of the light guide 110. The collimated light source 140 comprises a tapered collimator 142 and an optical emitter 144. The tapered collimator 142, in turn, comprises a tapered light guide, as illustrated. Light emitted by the optical emitter 144 is collimated by the tapered collimator 142 to provide collimated guided light within the light guide 110, according to various embodiments.

As described above, in some embodiments one or both of the directional emitter 120 of the first backlight region 100a and the broad-angle emitter 130 of the second backlight region 100b comprise active optical emitters. FIG. 7A illustrates a cross-sectional view of a dual view zone backlight 100 in an example, according to an embodiment consistent with the principles described herein. FIG. 7B illustrates a cross-sectional view of a dual view zone backlight 100 in another example, according to an embodiment consistent with the principles described herein. FIG. 7C illustrates a perspective view of a dual view zone backlight 100 in an example, according to another embodiment consistent with the principles described herein. In particular, FIGS. 7A, 7B, and 7C illustrate the dual view zone backlight 100 with both the directional emitter 120 and the broad-angle emitter 130 comprising active optical emitters. Further, FIGS. 7A-7C illustrate the directional emitted light 102 and broad-angle emitted light 104 having characteristics substantially similar those described above with reference to FIGS. 3A-3B and 4. Further, as illustrated in FIGS. 7A, 7B, and 7C, the dual view zone backlight 100 comprises the first backlight region 100a comprising the directional emitter 120 and the second backlight region 100b comprising the broad-angle emitter 130 as well as the boundary 100'. FIGS. 7A-7C also illustrate a substrate 111 that may support and may also interconnect the active optical emitters of the directional emitter 120 and the broad-angle emitter 130, in some embodiments.

As illustrated in FIGS. 7A-7C, the directional emitter 120 within the first backlight region 100a comprises a plurality of active optical emitters configured to provide to provide the directional emitted light 102. As illustrated, active optical emitters of the directional emitter 120 are spaced apart from one another across the first backlight region 100a. An active optical emitter of the active optical plurality within the directional emitter 120 is configured to provide the directional emitted light 102 to the first view zone I, as illustrated.

Further, as illustrated in FIG. 7A-7C, the broad-angle emitter 130 within the second backlight region 100b comprises a plurality of active optical emitters configured to provide the broad-angle emitted light 104. As illustrated, active optical emitters of the active optical emitter plurality are spaced apart from one another across the second backlight region 100b. An active optical emitter of the active optical emitter plurality within the broad-angle emitter 130 is configured to provide the broad-angle emitted light 104 to both the first view zone I and second view zones II.

According to some embodiments, an active optical emitter of one or both of the directional emitter 120 and the broad-angle emitter 130 may comprise a micro light emitting diode (microLED or µLED). Herein, µLED is defined as a microscopic light emitting diode (LED), i.e., an LED having microscopic dimensions. In some embodiments, the μLED may comprise a plurality of μLEDs. According to some embodiments, the active emitter may comprise an organic light emitting diode (OLED). As defined herein, an OLED is an emitter having an emissive electroluminescent film or layer comprising an organic compound configured to emit light in response to an electric current or similar electrical stimulus. In other embodiments, another type of optical emitter may be used as the active optical emitter such as, but not limited to, an LED, a high intensity LED, and a quantum dot LED. In some embodiments, the active optical emitter (e.g., the LED, μLED, OLED, etc.) may be a multibeam element. In particular, a size of the active optical emitter may be between one half and two times a size of a light valve used to modulate light emitted by the active optical emitter.

In some embodiments, the active optical emitter of one or both of the directional emitter 120 and the broad-angle emitter 130 may be configured to provide light that is substantially monochromatic having a particular color (i.e., the light may include a particular wavelength of light). In other embodiments, the active optical emitter may be configured to provide polychromatic light such as, but not limited to, white light, that includes a plurality or range of wavelengths. For example, active optical emitter may be configured to provide one or more of red light, green light, blue light, or a combination thereof. In another example, the active optical emitter may be configured to provide light that is substantially white light (i.e., the active optical emitter may be a white μLED or white OLED). In some embodiments, the active optical emitter may include a micro-lens, a diffraction grating, or another optical film or component configured to provide one or more of collimation (e.g., according to a collimation factor), polarization control, and a direction of light emitted by the active optical emitter. For example, the micro-lens, diffraction grating, or another optical film may be used to control a direction of light emitted by the active optical emitter (e.g., to provide the directional emitted light 102). Active optical emitters of one or both of the directional emitter 120 and the broad-angle emitter 130 may be independently controlled, activated, or powered to one or both of provide local dimming and switch between modes, according to some embodiments.

In some embodiments, the active optical emitters may be supported by a substrate 150, e.g., as illustrated. Further, as with the passive optical emitters described above, the active optical emitters of one or both of the first backlight region 100*a* and the second backlight region 100*b* may be arranged either as 1D or 2D arrays.

In some embodiments (not illustrated), the broad-angle emitter 130 may comprise a first plurality of directional active optical emitters configured to provide emitted light in the direction of the first view zone I. In some of these embodiments, the broad-angle emitter 130 may further comprise a second plurality of directional active optical emitters configured to provide emitted light in the direction of the second view zone II. Directional active optical emitters of both the first directional active optical emitter plurality and the second active optical emitter plurality may be spaced apart from one another across the second backlight region 100*b*. For example, the directional active optical emitters of both the first and second active optical emitter pluralities may be arranged within the second backlight region 100*b* substantially similar to the directional scattering elements 132', 132" of both the first directional scattering element plurality and the second directional scattering element plurality, described above with respect to FIG. 3C. Likewise, a directional optical emitter of one or both of the first and second directional active optical emitter pluralities may be the same as, or substantially similar to, a directional active optical emitter of the first backlight region 100*a*, in some embodiments. Further, a combination of the emitted light from the first directional active optical emitter plurality and the emitted light from the second directional active optical emitter plurality may represent the broad-angle emitted light 104 of the broad-angle emitter 130, according to various embodiments.

According to other embodiments of the principles described herein, a dual-mode display is provided. The dual-mode display employs a dual backlight configuration to provide a dual-mode of operation, according to various embodiments. In particular, the dual-mode display combines a dual view zone backlight with a broad-angle backlight in a dual-backlight display configuration to provide a first mode comprising two separate images on the same screen and a second mode comprising a single image occupying the whole screen. Moreover, a first image of the two separate images may appear as occupying the whole screen, while a second image of the two separate images may appear only in a portion of the screen, according to some embodiments. The dual-mode display may be used as a dashboard display in a motor vehicle (e.g., a car), for example. During the first mode, e.g., a passenger entertainment mode, a different image may be projected using the dual view zone backlight for each of the driver and a passenger. The passenger may see the projected image as occupying the whole screen while simultaneously the driver may see a different image that occupies on a portion of the screen, for example. During the second mode, e.g., a full display mode, the same image may be projected to both the driver and the passenger.

Figure 8A:
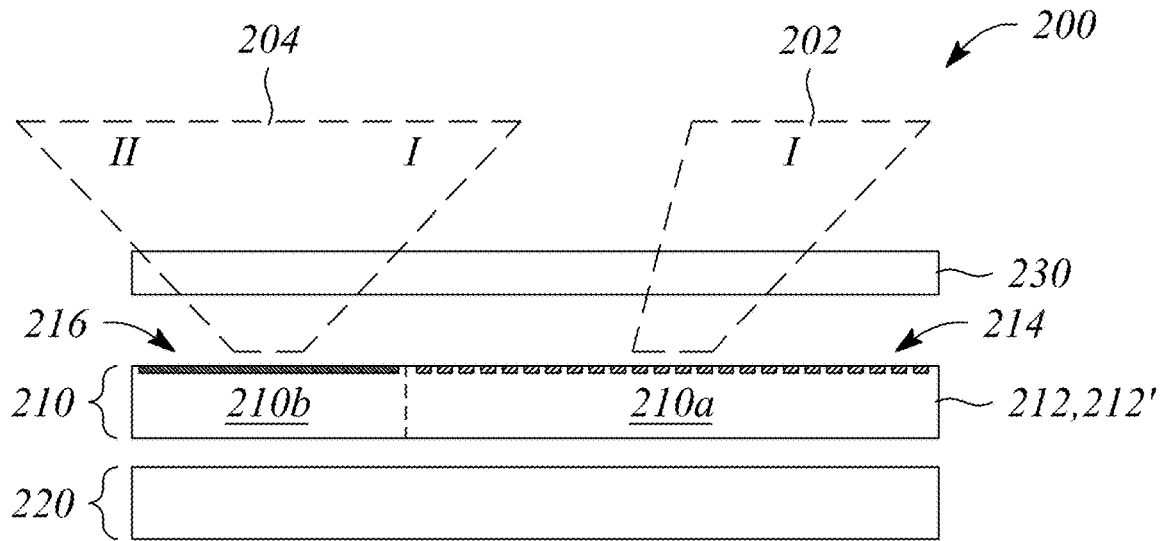
FIG. 8A illustrates a cross-sectional view of dual-mode display in an example, according to another embodiment consistent with the principles described herein.
Figure 8B:
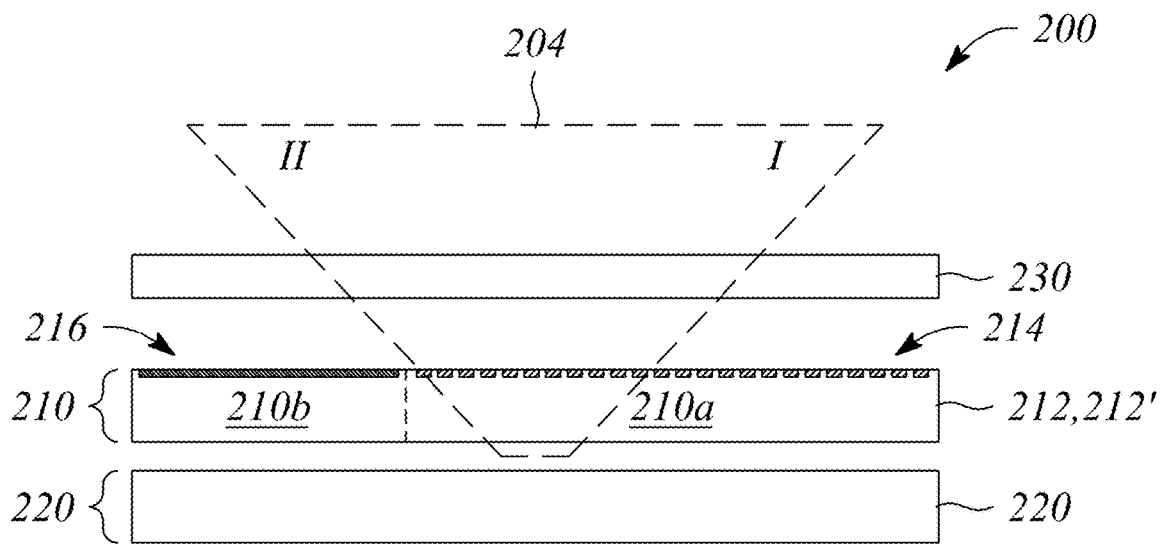
FIG. 8B illustrates a cross-sectional view of dual-mode display in another example, according to an embodiment consistent with the principles described herein.

FIG. 8A illustrates a cross-sectional view of dual-mode display 200 in an example, according to another embodiment consistent with the principles described herein. FIG. 8B illustrates a cross-sectional view of dual-mode display 200 in another example, according to an embodiment consistent with the principles described herein. In particular, FIG. 8A may represent the dual-mode display 200 during the first mode (Mode 1), while FIG. 8B may represent the dual-mode display 200 during the second mode (Mode 2), for example.

As illustrated in FIGS. 8A and 8B, the dual-mode display 200 comprises a dual view zone backlight 210. The dual view zone backlight 210 is configured to emit light during the first mode (Mode 1). In particular, the dual view zone backlight 210 is configured to emit the light from a first backlight region 210*a* of the dual view zone backlight 210 toward a first view zone I as directional emitted light 202 during the first mode (Mode 1). Further, during the first mode (Mode 1), the dual view zone backlight 210 is configured to emit the light from a second backlight region 210*b* toward both the first view zone I and a second view zone II as broad-angle emitted light 204. In some embodiments, the dual view zone backlight 210 may be substantially similar to the dual view zone backlight 100 previously discussed. Accordingly, the dual view zone backlight 210 comprises a directional emitter 214 in the first backlight region 210*a* and a broad-angle emitter 216 in the second backlight region 210*b*. Likewise, directional emitter 214, the broad-angle emitter 216, the first backlight region 210*a*, and the second backlight region 210*b*, may be substantially similar to the above-described, directional emitter 120, broad-angle emitter 130, first backlight region 100*a*, and second backlight region 100*b*, respectively. FIG. 8A illustrates the dual view zone backlight 210 providing both the directional emitted light 202 and the broad-angle emitted light 204 during the first mode (Mode 1), each of the directional emitted light 202 and the broad-angle emitted light 204 being delineated by dashed lines.

The dual-mode display 200 further comprises a broad-angle backlight 220 adjacent to the dual view zone backlight 210. As illustrated in FIGS. 8A and 8B, the broad-angle backlight 220 is located below the dual view zone backlight 210 and separated therefrom by a narrow gap. Further, a top surface (i.e., a light emitting surface) of the broad-angle backlight 220 is substantially parallel to a bottom surface (i.e., a light receiving surface) of the dual view zone backlight 210, as illustrated. According to various embodiments, the broad-angle backlight 220 is configured to emit light during the second mode (Mode 2) of the dual-mode display 200. Further, the light emitted by the broad-angle backlight 220 is emitted through the dual view zone backlight 210 toward both the first view zone I and second view zone II as broad-angle emitted light 204. In particular, the broad-angle emitted light 204 from the broad-angle backlight 220 is emitted from the top surface of the broad-angle backlight 220 and toward the bottom surface of the dual view zone backlight 210. The broad-angle emitted light 204 propagates through the thickness of the dual view zone backlight 210 to exit from a top surface of the dual view zone backlight 210 and toward both the first view zone I and the second view zone II, as illustrated.

The dual-mode display 200 further comprises an array of light valves 230. The array of light valves 230 is configured to modulate the light emitted by the dual view zone backlight 210 and the broad-angle backlight 220 to provide a displayed image. In particular, the array of light valves 230 is configured both to modulate the directional emitted light 202 and the broad-angle emitted light 204 from the dual view zone backlight 210 during the first mode and to modulate the broad-angle emitted light 204 from the broad-angle backlight 220 during the second mode. In various embodiments, different types of light valves may be employed as the light valves 230 of the array of the valves, including but not limited to, one or more of liquid crystal light valves, electrophoretic light valves, and light valves based on electrowetting.

In various embodiments, during the first mode the dual-mode display 200 is configured to provide the displayed image comprising a first image exclusively visible in the first view zone I and a second image exclusively visible in the second view zone II. In some embodiments, the first image visible in the first view zone I may appear as occupying or extending across an entire surface of the dual-mode display 200. Further, the second image visible in the second view zone II may appear as occupying or extending only across a portion the surface of the dual-mode display 200 corresponding to the second backlight region 210b, according to some embodiments. A remaining portion of the dual-mode display surface may be dark when viewed in or from the second view zone II during the first mode.

In various embodiments, during the second mode the dual-mode display 200 is configured to provide the displayed image visible in both the first view zone I and the second view zone II. Moreover, the same displayed image is provided to both the first and second view zones I, II during the second mode. Further, during the second mode, the dual view zone backlight 210 is inactive and does not provide emitted light. Instead, emitted light that is modulated to as the displayed image is provided by the broad-angle backlight 220 as the broad-angle emitted light 204.

As mentioned above, the dual view zone backlight 210 may be substantially similar to the above-described dual view zone backlight 100 in some embodiments. In particular, when one or both of the directional emitter 214 and broad-angle emitter 216 comprise passive optical emitters, the dual view zone backlight 210 may comprise a light guide 212 configured to guide light as guided light. According to various embodiments, the light guide 212 may be configured to guide the guided light using total internal reflection. Further, the guided light may be guided one or both of at a non-zero propagation angle by or within the light guide 212. In some embodiments, the light guide 212 may be substantially similar to the light guide 110 of the dual view zone backlight 100, described above. In some embodiments, the guided light may be collimated or may be a collimated light beam having a collimation factor. Alternatively, when one or both of the directional emitter 214 and broad-angle emitter 216 comprises active optical emitters, the dual view zone backlight 210 may comprise a transparent substrate 212' configured to be transparent to broad-angle emitted light 204 emitted by the broad-angle backlight 220 during the second mode (Mode 2).

In some embodiments in which passive optical emitters are employed, the directional emitter 214 of the dual view zone backlight 210 may further comprise a plurality of directional scattering elements spaced apart from one another along a length of a portion of the light guide 212 corresponding to the first backlight region 210a. A directional scattering element of the directional scattering element plurality of the directional emitter 214 may be configured to scatter out of the light guide 212 a portion of the guided light as the directional emitted light 202. Further, each directional scattering element of the directional scattering element plurality may be generally distinct and separated from the other ones of the directional scattering elements of the plurality. In various embodiments, the plurality of directional scattering elements may be arranged in a variety of configurations that are one or more of at, on and in the surface (e.g., the first surface or the second surface) of the light guide 212. According to some embodiments, the directional scattering elements of the directional emitter 214 may be substantially similar to the directional scattering elements 122 of the directional scattering feature of the directional emitter 120, described above with respect to the dual view zone backlight 100.

Further, in some embodiments in which passive optical emitters are employed, the broad-angle emitter 216 of the dual view zone backlight 210 may comprise a broad-angle scattering feature distributed along a length of a portion of the light guide 212 corresponding to the second backlight region 210b. The broad-angle scattering feature of the broad-angle emitter 216 is configured to scatter out of the light guide 212 a portion of the guided light as the broad-angle emitted light 204. In some embodiments, the broad-angle scattering feature of the broad-angle emitter 216 may comprise a plurality of different directional scatterers configured to cooperatively scatter out light as the broad-angle emitted light 204. Specifically, the broad-angle scattering feature of the broad-angle emitter 216 may comprise a first plurality of directional scattering elements configured to scatter out the guided light portion in the direction of the first view zone I, and a second plurality of directional scattering element configured to scatter out the guided light portion in the direction of the second view zone II. A directional scattering element of the first or second plurality of directional scattering elements may be the same as, or substantially similar to, a directional scattering element of the directional emitter 214, for example.

In some embodiments, the directional scattering element may comprise one or more of a diffraction grating, a micro-reflective element, and a micro-refractive element. In some embodiments, the directional scattering element may be configured as one or both of an angle preserving scattering element and a unidirectional scattering element. The angle-preserving scattering may be configured to preserve a collimation factor of the guided light portion in the directional emitted light 202, for example. That is, the angle-preserving scattering is configured to preserve an angular spread of light incident on the directional scattering element in the directional emitted light 202.

In some embodiments, the plurality of directional scattering elements comprises a plurality of multibeam elements configured to provide the directional emitted light 202 as directional light beams having principal angular directions corresponding to view directions of a multiview image. In these embodiments, the displayed image visible in the first view zone during the first mode may comprise the multiview image. In some embodiments, the multibeam elements of the plurality are substantially similar to the multibeam elements of the dual view zone backlight 100, described above.

Alternatively, when one or both of the directional emitter 214 and broad-angle emitter 216 comprise active optical emitters, the dual view zone backlight 210 may comprise a transparent substrate 212' configured to be transparent to the broad-angle emitted light 204 emitted by the broad-angle backlight 220 during the second mode (Mode 2), as described above.

In some embodiments in which active optical emitters are employed, the directional emitter 214 of the dual view zone backlight 210 further comprises a plurality of directional active optical emitters spaced apart from one another along a length of a portion of the transparent substrate 212' corresponding to the first backlight region 210a. According to various embodiments, a directional active optical emitter of the directional active optical emitter plurality is configured to emit light as the directional emitted light 202 during the first mode (Mode 1). In some embodiments, the directional active optical emitters of the directional emitter 214 may be substantially similar to active optical emitters of the directional emitter 120 of the dual view zone backlight 100 described above with reference to FIGS. 7A-7B.

Further, in some embodiments in which active optical emitters are employed, the broad-angle emitter 216 of the dual view zone backlight 210 further comprises a plurality of broad-angle active optical emitters spaced apart from one another along a length of a portion of the transparent substrate 212' corresponding to the second backlight region 210b. According to various embodiments, a broad-angle active optical emitter of the broad-angle active optical emitter plurality is configured to emit light as the broad-angle emitted light 204 during the first mode (Mode 1). In some embodiments, the broad-angle active optical emitters of the broad-angle emitter 216 may be substantially similar to active optical emitters of the broad-angle emitter 130 of the dual view zone backlight 100 described above with reference to FIGS. 7A-7B.

Figure 9:
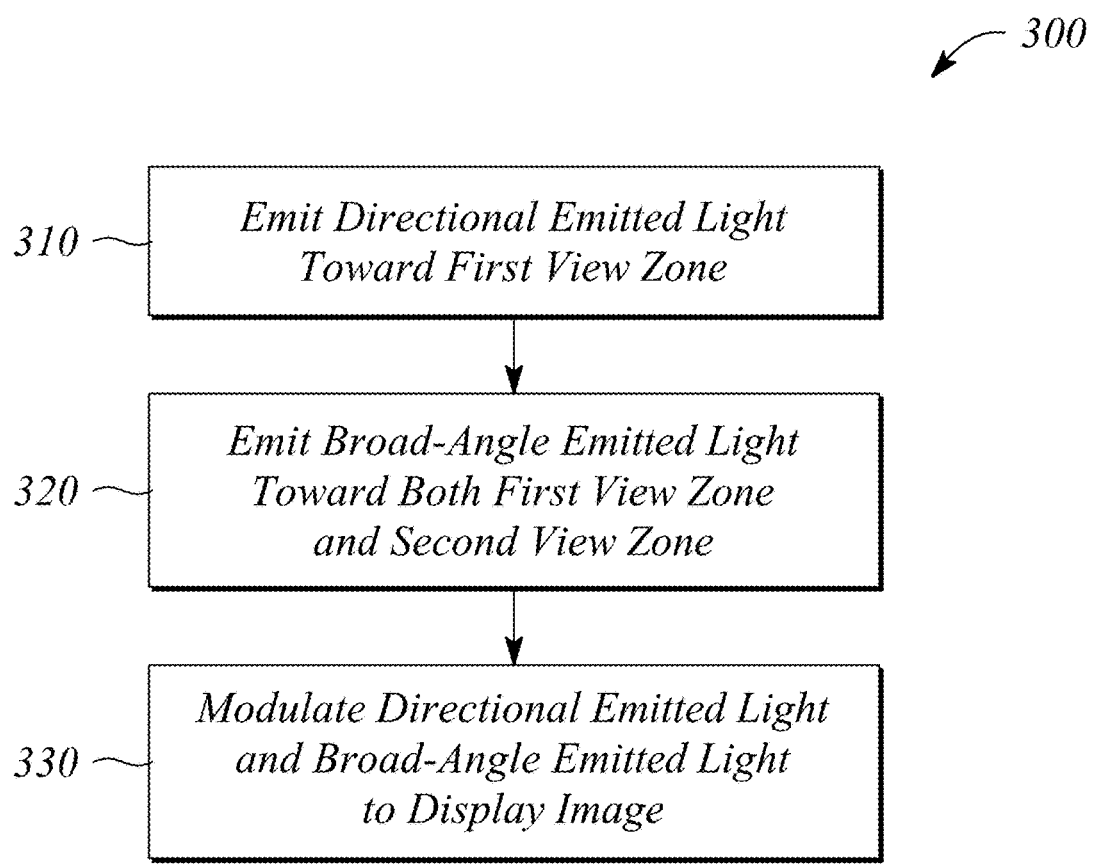
FIG. 9 illustrates a flow chart of a method of dual view zone backlight operation in an example, according to an embodiment consistent with the principles herein.

In accordance with other embodiments of the principles described herein, a method 300 of dual view zone backlight operation is described. FIG. 9 illustrates a flow chart of a method 300 of dual view zone backlight operation in an example, according to an embodiment consistent with the principles herein. As illustrated in FIG. 9, the method 300 of dual view zone backlight operation comprises emitting 310 directional emitted light toward a first view zone using a first backlight region comprising a directional emitter. In some embodiments, the directional emitted light that is emitted 310 toward the first view zone may be substantially similar to the directional emitted light 102 described above with respect to the dual view zone backlight 100. Further, the first backlight region and the directional emitter may be substantially similar respectively to the first backlight region 100a and directional emitter 120, also of the above-described dual view zone backlight 100, in some embodiments.

The method 300 of dual view zone backlight operation illustrated in FIG. 9 further comprises emitting 320 broad-angle emitted light toward the first view zone and a second view zone. According to various embodiments, emitting 320 broad-angle emitted light uses a second backlight region comprising a broad-angle emitter, the second backlight region being adjacent to the first backlight region. Further, a viewing range of the first view zone differs both in viewing angle and direction from a viewing angle and direction of a viewing range of the second view zone. In some embodiments, the broad-angle emitted light that is emitted 320 toward both the first and second view zones may be substantially similar to the broad-angle emitted light 104 described above with respect to the dual view zone backlight 100. Further, the second backlight region and broad-angle emitter may be substantially similar respectively to the second backlight region 100b and broad-angle emitter 130, also of the above-described dual view zone backlight 100, in some embodiments.

In some embodiments (not illustrated), the method 300 of dual view zone backlight operation further comprises guiding light in a light guide as guided light, the first and second backlight regions comprising adjacent portions of the light guide. According to various embodiments, the light guide may be configured to guide the guided light using total internal reflection. In some embodiments, the guided light may be collimated or may be a collimated light beam. The light guide may be substantially similar to the light guide 110 of the dual view zone backlight 100, described above, according to some embodiments.

In some embodiments (not illustrated), the method 300 of dual view zone backlight operation may further comprise scattering out a portion of the guided light as the directional emitted light using a directional scattering feature of the directional emitter located along a portion of the light guide corresponding to the first backlight region. In some embodiments, directional scattering feature may be substantially similar to the directional scattering feature of the directional emitter 120 described above with respect to the dual view zone backlight 100. For example, the directional scattering feature may comprise a plurality of directional scattering elements (or equivalently, directional scatterers). The directional scattering elements of the directional scattering element plurality may be spaced apart from one another along a length of the light guide portion corresponding to the first backlight region. A directional scattering element of the plurality is configured to scatter out of the light guide the portion of guided light as the directional emitted light.

In some embodiments (not illustrated), the method 300 of dual view zone backlight operation may further comprise scattering out a portion of the guided light as the broad-angle emitted light using a broad-angle scattering feature of the broad-angle emitter located along a portion of the light guide corresponding to the second backlight region. In some embodiments, the broad-angle scattering feature may be substantially similar to the broad-angle scattering feature of the broad-angle emitter 130 described with respect to the dual view zone backlight 100. For example, the broad-angle scattering feature may comprise a plurality of directional scatterers. Specifically, the broad-angle scattering feature may comprise a first plurality of directional scattering elements configured to scatter out the guided light portion in the direction of the first view zone. Further, the broad-angle scattering feature may comprise a second plurality of directional scattering elements configured to scatter out the guided light portion in the direction of the second view zone.

In some embodiments, a directional scattering element of one or both of the directional scattering feature and the broad-angle scattering feature may comprise one or more of a diffraction grating, a micro-reflective element, and a micro-refractive element. In some embodiments, the directional scattering elements spaced apart from one another may be configured as one or both of angle preserving scattering elements and unidirectional scattering elements.

In some embodiments, one or both of the directional emitter and the broad-angle emitter comprises a plurality of active optical emitters. In particular, the plurality of active optical emitters of the directional emitter may comprise directional active optical emitters spaced apart from one another across the first backlight region 210a. Further, the plurality of active optical emitters of the broad-angle emitter may comprise broad-angle active optical emitters spaced apart from one another across the second backlight region 210b.

In some embodiments (not illustrated), the method 300 of dual view zone backlight operation further comprises providing light using a second backlight adjacent to a surface of the dual view zone backlight. In some embodiments, the second backlight may be a broad-angle backlight substantially similar to the broad-angle backlight 220, previously described with respect to the dual-mode display 200. As such, the second backlight may be configured to emit broad-angle light. In these embodiments, the method 300 of dual view zone backlight operation may further comprise transmitting the light from the second backlight through a thickness of dual view zone backlight. In various embodiments, the dual view zone backlight is optically transparent to light emitted from the second backlight. The method of dual view zone backlight operation further comprises emitting the light from the second backlight toward the first and second view zones as emitted light. A broad cone angle of the light emitted from the second backlight may allow the emitted light to be viewed from both of the first view zone and the second view zones. As previously discussed with regard to the dual-mode display, both the directional emitted light and the broad-angle emitted light may be emitted during a first mode, whereas the second backlight provides light during a second mode.

In some embodiments, the method 300 of dual view zone backlight operation further comprises modulating 330 the directional emitted light and the broad-angle emitted light using an array of light valve to provide a displayed image. In particular, a first displayed image is provided in the first view zone and a second displayed image is provided in the second view zone by modulating 330. In some embodiments, the array of light valves may be substantially similar to the array of light valves 230 of the above-described dual-mode display 200. For example, different types of light valves maybe employed as the light valves of the array of the valves, including but not limited to, one or more of liquid crystal light valves, electrophoretic light valves, and light valves based on electrowetting.

Thus, there have been described examples and embodiments of a dual view zone backlight, dual-mode display, and a method of dual view zone backlight operation that employ a first backlight region comprising a directional emitter and a second backlight region comprising a broad-angle emitter to provide emitted light to a pair of view zones. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A dual view zone backlight comprising:
   a transparent substrate having a substrate surface, the substrate surface including a first substrate region and a second substrate region adjacent to the first substrate region;
   a first light emitting diode disposed on the substrate surface in the first substrate region and configured to generate and directly emit directional emitted light toward a first view zone; and
   a second light emitting diode disposed on the substrate surface in the second substrate region and configured to generate and directly emit broad-angle emitted light toward both the first view zone and a second view zone,
   wherein a viewing range of the first view zone has a direction that differs from a direction of a viewing range of the second view zone, wherein the viewing range of the first view zone and viewing range of the second view zone are mutually exclusive in angular space.

2. The dual view zone backlight of claim 1, further comprising a first plurality of light emitting diodes disposed on the substrate surface and spaced apart from one another in the first substrate region, the first plurality of light emitting diodes being configured to emit the directional emitted light toward the first view zone, the first plurality of light emitting diodes including the first light emitting diode.

3. The dual view zone backlight of claim 1, further comprising a second plurality of light emitting diodes disposed on the substrate surface and spaced apart from one another in the second substrate region, the second plurality of light emitting diodes being configured to emit the broad-angle emitted light toward both the first view zone and the second view zone, the second plurality of light emitting diodes including the second light emitting diode.

4. The dual view zone backlight of claim 3, wherein:
   a first subset of light emitting diodes of the second plurality of light emitting diodes is configured to provide emitted light in the direction of the first view zone;
   a second subset of light emitting diodes of the second plurality of light emitting diodes is configured to provide emitted light in the direction of the second view zone; and
   a combination of the emitted light from the first subset and the emitted light from the second subset represents the broad-angle emitted light.

5. An electronic display comprising the dual view zone backlight of claim 1, the electronic display further comprising an array of light valves configured to modulate both the directional emitted light and the broad-angle emitted light as a displayed image, the displayed image being provided to the first and second view zones.

6. The electronic display of claim 5, wherein the displayed image provided to the first view zone is different from the displayed image provided to the second view zone.

7. A dual-mode backlight comprising the dual view zone backlight of claim 1, the dual-mode backlight further comprising a second backlight adjacent to the dual view zone backlight and configured to emit light toward the dual view zone backlight, the dual view zone backlight being optically transparent to the light emitted from the second backlight,
wherein the dual view zone backlight is configured to emit both the directional emitted light and the broad-angle emitted light during a first mode, the second backlight being configured to emit the light toward the dual view zone backlight during a second mode.

8. A dual-mode display comprising:
a dual view zone backlight configured to emit light during a first mode, the dual view zone backlight comprising a transparent substrate having a substrate surface, the substrate surface including a first substrate region and a second substrate region adjacent to the first substrate region, the dual view zone backlight further comprising a first light emitting diode disposed on the substrate surface in the first substrate region and a second light emitting diode disposed on the substrate surface in the second substrate region, the first light emitting diode being configured to emit light toward a first view zone as directional emitted light, the second light emitting diode being configured to emit light toward both the first view zone and a second view zone as broad-angle emitted light;
a broad-angle backlight adjacent to the dual view zone backlight and configured to emit light during a second mode, the light being emitted through the dual view zone backlight toward both the first and second view zones as broad-angle light; and
an array of light valves configured to modulate the light emitted by the dual view zone backlight and the broad-angle backlight to provide a displayed image.

9. The dual-mode display of claim 8, wherein during the first mode the dual-mode display is configured to provide the displayed image comprising a first image exclusively visible in the first view zone and a second image exclusively visible in the second view zone, and wherein during the second mode the dual-mode display is configured to provide the displayed image visible in both the first and second view zones.

10. The dual-mode display of claim 8, wherein the substrate is transparent to the broad-angle light; and
wherein the dual view zone backlight further comprises:
a first plurality of light emitting diodes that are spaced apart from one another along a length of a portion of the substrate surface in the first substrate region and configured to emit the directional emitted light toward the first view zone, the first plurality of light emitting diodes including the first light emitting diode; and
a second plurality of light emitting diodes that are distributed along a length of a portion of the substrate surface in the second substrate region and configured to emit the broad-angle emitted light toward both the first view zone and the second view zone, the second plurality of light emitting diodes including the second light emitting diode.

11. A method of dual view zone backlight operation, the method comprising:
providing a transparent substrate having a substrate surface, the substrate surface including a first substrate region and a second substrate region adjacent to the first substrate region;
emitting directional emitted light toward a first view zone using a first light emitting diode disposed on the substrate surface in the first substrate region; and
emitting broad-angle emitted light toward both the first view zone and a second view zone using a second light emitting diode disposed on the substrate surface in the second substrate region,
wherein a viewing range of the first view zone differs both in viewing angle and direction from a viewing angle and direction of a viewing range of the second view zone.

12. The method of dual view zone backlight operation of claim 11, wherein:
a first plurality of light emitting diodes is disposed on the substrate surface and spaced apart from one another in the first substrate region and configured to emit the directional emitted light toward the first view zone;
the first plurality of light emitting diodes includes the first light emitting diode;
a second plurality of light emitting diodes is disposed on the substrate surface and spaced apart from one another in the second substrate region and configured to emit the broad-angle emitted light toward both the first view zone and the second view zone; and
the second plurality of light emitting diodes includes the second light emitting diode.

13. The method of dual view zone backlight operation of claim 11, further comprising:
providing light using a second backlight adjacent to the substrate surface of the dual view zone backlight;
transmitting the light from the second backlight through a thickness of the dual view zone backlight; and
emitting the light from the second backlight toward the first and second view zones as emitted light,
wherein both the directional emitted light and the broad-angle emitted light are emitted during a first mode and the second backlight provides light during a second mode.

14. The method of dual view zone backlight operation of claim 11, further comprising modulating the directional emitted light and the broad-angle emitted light using an array of light valve to provide a first displayed image in the first view zone and a second displayed image in the second view zone.

* * * * *